(12) United States Patent
Kristy et al.

(10) Patent No.: US 12,119,467 B2
(45) Date of Patent: Oct. 15, 2024

(54) COMPOSITE THERMAL MANAGEMENT SHEET, METHOD OF MANUFACTURE, AND ARTICLES USING THE SAME

(71) Applicant: Rogers Corporation, Chandler, AZ (US)

(72) Inventors: Max Kristy, Chicago, IL (US); Kenneth A. Mazich, Hinsdale, IL (US)

(73) Assignee: ROGERS CORPORATION, Chandler, AZ (US)

( * ) Notice: Subject to any disclaimer, the term of this patent is extended or adjusted under 35 U.S.C. 154(b) by 150 days.

(21) Appl. No.: 17/689,420

(22) Filed: Mar. 8, 2022

(65) Prior Publication Data

US 2022/0294044 A1     Sep. 15, 2022

Related U.S. Application Data

(60) Provisional application No. 63/158,675, filed on Mar. 9, 2021.

(51) Int. Cl.
| | |
|---|---|
| *H01M 10/653* | (2014.01) |
| *H01M 10/6551* | (2014.01) |
| *H01M 10/658* | (2014.01) |
| *H01M 10/6595* | (2014.01) |

(Continued)

(52) U.S. Cl.
CPC ..... *H01M 10/653* (2015.04); *H01M 10/6551* (2015.04); *H01M 10/658* (2015.04); *H01M 10/6595* (2015.04); H01M 10/625 (2015.04); H01M 50/24 (2021.01)

(58) Field of Classification Search
CPC ............. H01M 10/625; H01M 10/653; H01M 10/6551; H01M 10/658; H01M 10/6595; H01M 50/24; Y02E 60/10
See application file for complete search history.

(56) References Cited

U.S. PATENT DOCUMENTS

| | | |
|---|---|---|
| 3,639,299 A | 2/1972 | Macdowall |
| 3,803,063 A | 4/1974 | Krentz, Jr. |
| 3,868,346 A | 2/1975 | Merrill |

(Continued)

FOREIGN PATENT DOCUMENTS

| | | |
|---|---|---|
| CA | 705937 A | 3/1965 |
| CN | 102117945 A | 7/2011 |

(Continued)

OTHER PUBLICATIONS

PCT International Preliminary Report on Patentability and Written Opinion issued Sep. 12, 2023 by the International Bureau of WIPO for International Application No. PCT/US2022/019286 filed Mar. 8, 2022, 6 pages.

(Continued)

*Primary Examiner* — Lingwen R Zeng
(74) *Attorney, Agent, or Firm* — CANTOR COLBURN LLP

(57) ABSTRACT

A composite thermal management sheet for a battery includes a silicone foam layer; and a reactive filler composition disposed within the silicone foam layer, the reactive filler composition including a first filler that decomposes to generate water upon initial exposure to heat; and a second filler different from the first filler, wherein the second filler forms a thermal barrier layer with a decomposition product of the first filler, or absorbs the water, or both.

20 Claims, 16 Drawing Sheets

(51) Int. Cl.
    *H01M 10/625*    (2014.01)
    *H01M 50/24*    (2021.01)

(56) References Cited

U.S. PATENT DOCUMENTS

| | | | |
|---|---|---|---|
| 3,912,650 | A | 10/1975 | Khalid et al. |
| 4,757,094 | A | 7/1988 | Teumac et al. |
| 4,833,190 | A | 5/1989 | Cella et al. |
| 5,670,272 | A | 9/1997 | Cheu et al. |
| 7,306,870 | B2 | 12/2007 | Gilicinski et al. |
| 8,541,126 | B2 | 9/2013 | Hermann et al. |
| 8,592,067 | B2 | 11/2013 | Yokoyama et al. |
| 8,592,076 | B2 | 11/2013 | Sugita et al. |
| 8,663,774 | B2 | 3/2014 | Fernando et al. |
| 8,729,155 | B2 | 5/2014 | Wierzbicki et al. |
| 9,012,062 | B2 | 4/2015 | Smith et al. |
| 9,676,168 | B2 | 6/2017 | Contzen et al. |
| 9,716,296 | B2 | 7/2017 | Wayne et al. |
| 9,797,664 | B2 | 10/2017 | Wayne et al. |
| 9,825,345 | B2 | 11/2017 | Liu et al. |
| 10,122,054 | B2 | 11/2018 | Shen et al. |
| 10,158,102 | B2 | 12/2018 | Wu et al. |
| 10,431,858 | B2 | 10/2019 | Hartmann et al. |
| 10,483,507 | B2 | 11/2019 | Gerundt et al. |
| 10,593,921 | B2 | 3/2020 | Page et al. |
| 10,833,300 | B2 | 11/2020 | Verhaag et al. |
| 11,702,346 | B2 | 7/2023 | Evans et al. |
| 2005/0170238 | A1 | 8/2005 | Abu-Isa et al. |
| 2006/0261304 | A1 | 11/2006 | Muthukumaran et al. |
| 2007/0264485 | A1 | 11/2007 | Stepanian et al. |
| 2011/0159341 | A1 | 6/2011 | Iwamoto et al. |
| 2011/0288210 | A1 | 11/2011 | Pinnavaia et al. |
| 2014/0329079 | A1 | 11/2014 | Liu et al. |
| 2015/0017856 | A1 | 1/2015 | Davis et al. |
| 2016/0380244 | A1 | 12/2016 | Evans et al. |
| 2017/0214103 | A1 | 7/2017 | Onnerud et al. |
| 2017/0301968 | A1 | 10/2017 | Cooney et al. |
| 2017/0313941 | A1 | 11/2017 | Atluri et al. |
| 2017/0352935 | A1 | 12/2017 | Perdu et al. |
| 2018/0183114 | A1 | 6/2018 | Rittner et al. |
| 2020/0161727 | A1 | 5/2020 | Phlegm et al. |
| 2020/0220238 | A1 | 7/2020 | Yeh et al. |
| 2020/0287252 | A1 | 9/2020 | Li et al. |
| 2020/0388810 | A1 | 12/2020 | Wang |
| 2021/0013460 | A1 | 1/2021 | Ootsuki et al. |
| 2021/0163303 | A1 | 6/2021 | Evans et al. |
| 2021/0257690 | A1 | 8/2021 | Kilhenny et al. |
| 2021/0288362 | A1 | 9/2021 | Churchill |
| 2021/0316537 | A1* | 10/2021 | Adam, Jr. ............ H01M 50/121 |
| 2022/0181715 | A1 | 6/2022 | Jiang et al. |
| 2022/0260195 | A1 | 8/2022 | Basoglu |
| 2022/0388291 | A1 | 12/2022 | Wang et al. |
| 2022/0389152 | A1 | 12/2022 | Wang et al. |
| 2022/0410528 | A1 | 12/2022 | Wang et al. |
| 2023/0032529 | A1 | 2/2023 | Evans et al. |

FOREIGN PATENT DOCUMENTS

| | | |
|---|---|---|
| CN | 104538698 A | 4/2015 |
| CN | 105742755 B | 4/2018 |
| CN | 112358731 A | 2/2021 |
| EP | 2993039 B1 | 3/2016 |
| EP | 2492991 | 4/2018 |
| EP | 3170222 B1 | 1/2020 |
| EP | 3780142 A1 | 2/2021 |
| GB | 1534408 | 12/1978 |
| JP | 2018206605 A | 12/2018 |
| JP | 2019096410 A | 6/2019 |
| KR | 20070030695 | 3/2007 |
| WO | 2010017169 A1 | 2/2010 |
| WO | 2010109218 A1 | 9/2010 |
| WO | 2011084804 A2 | 7/2011 |
| WO | 2015017856 A1 | 2/2015 |
| WO | 2015055773 A1 | 4/2015 |
| WO | 2017042308 A1 | 3/2017 |
| WO | 2017106524 A1 | 6/2017 |
| WO | 2019088195 A1 | 5/2019 |
| WO | 2019136000 A1 | 7/2019 |
| WO | 2020047059 A1 | 3/2020 |
| WO | 2020070275 A1 | 4/2020 |
| WO | 2020197982 A1 | 10/2020 |
| WO | 2020221808 A1 | 11/2020 |
| WO | 2020251825 A1 | 12/2020 |
| WO | 2021019495 A1 | 2/2021 |
| WO | 2021142169 A1 | 7/2021 |
| WO | 2023037271 A1 | 3/2023 |

OTHER PUBLICATIONS

Hamdani et al., "Flame Retardancy of Silicone-Based Materials", Polmer Degradation and Stability 94 (2009) pp. 465-495.

Hirschey, et al., "Review of Inorganic Salt Hydrates with Phase Change Temperature in Range of 5 C to 60 C and Material Cost Caomparison with Common Waxes" Abstract; 5th International High Performance Buildings Conference at Purdue, Jul. 9-12, 2018; pp. 1-10.

International Search Report For International Application No. PCT/US2022/019286; International Filing Date: Mar. 8, 2022; Date of Mailing: Jun. 22, 2022; 4 pages.

Norseal FS1000 Series, Intumescent, Airtight, Watertight and Resilient Sealing Foam;, retrieved from www.tapesolutions.saint-gobain.com on Jan. 22, 2021; 2 pages.

Song et al., "Effects of Inorganics on Thermal Property of Dolicone Rubber Composites", 21st International Conferenc on Composite Materials Xi'an, Aug. 20-25, 2017; 10 pages.

Written Opinion of the International Searching Authority For International Application No. PCT/US2022/019286; International Filing Date: Mar. 8, 2022; Date of Mailing: Jun. 22, 2022; 6 pages.

* cited by examiner

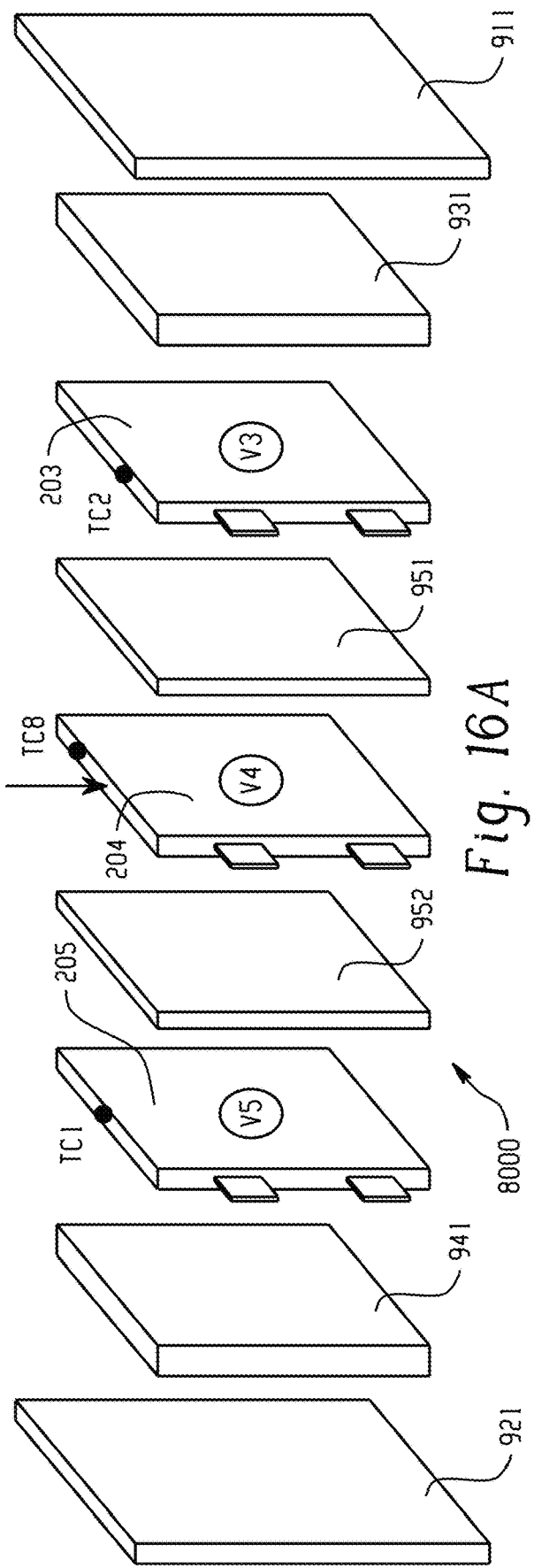
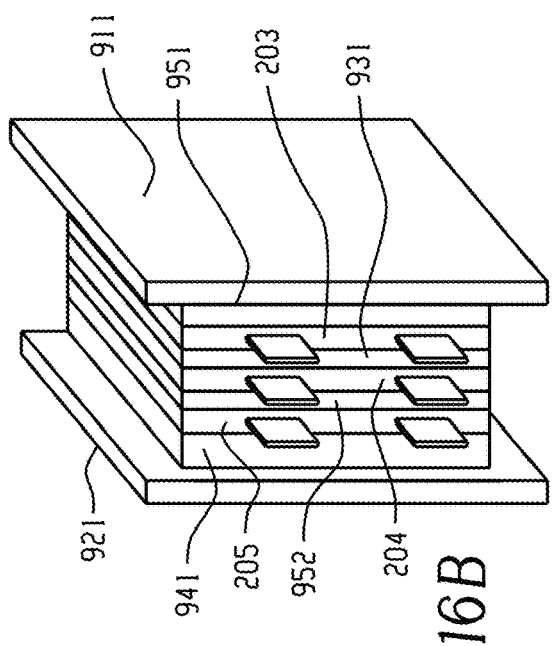
Fig. 16A
Fig. 16B

COMPOSITE THERMAL MANAGEMENT SHEET, METHOD OF MANUFACTURE, AND ARTICLES USING THE SAME

CROSS REFERENCE TO RELATED APPLICATIONS

This application claims the benefit of U.S. Application No. 63/158,675, filed on Mar. 9, 2021, which is incorporated herein by reference in its entirety.

BACKGROUND

This application is directed to a composite thermal management sheet for use in batteries, particularly for delaying or preventing thermal runaway in lithium-ion batteries. The application is further directed to methods for the manufacture of the composite thermal management sheet and battery components and batteries including the composite thermal management sheet(s).

The demand for electrochemical energy storage devices, such as lithium-ion batteries, is ever increasing due to the growth of applications such as electric vehicles and grid energy storage systems, as well as other multi-cell battery applications, such as electric bikes, uninterrupted power battery systems, and replacements for lead acid batteries. Due to their increasing use, methods for heat management are desired. For large format applications, such as grid storage and electric vehicles, multiple electrochemical cells connected in series and parallel arrays are often used, which can lead to thermal runaway. Once a cell is in thermal runaway mode, the heat produced by the cell can induce a thermal runaway propagation reaction in adjacent cells, with the potential to cause a cascading effect that can ignite the entire battery.

While attempts to reduce thermal runaway in batteries have been considered, many have drawbacks. For example, modifying the electrolyte by adding flame retardant additives, or using inherently non-flammable electrolytes have been considered, but these approaches can negatively impact the electrochemical performance of the battery. Other approaches for heat management or to prevent cascading thermal runaway include incorporating an increased amount of insulation between cells or clusters of cells to reduce the amount of thermal heat transfer during a thermal event. However, these approaches can limit the upper bounds of the energy density that can be achieved.

With the increasing demand for batteries with improved heat management or reduced risk of thermal runaway, there is accordingly a need for methods and components for use in batteries that prevents or delays the spread of heat, energy, or both to surrounding cells.

BRIEF SUMMARY

In an aspect a composite thermal management sheet for a battery includes a silicone foam layer; and a reactive filler composition disposed within the silicone foam layer, the reactive filler composition including a first filler that decomposes to generate water upon initial exposure to heat; and a second filler different from the first filler, wherein the second filler forms a thermal barrier layer with a decomposition product of the first filler, or absorbs the water, or both.

An assembly for a battery includes the above-described composite thermal management sheet disposed on a surface of an electrochemical cell.

Batteries including the above-described assembly are also disclosed.

The above-described and other features are exemplified by the following figures, detailed description, examples, and claims.

BRIEF DESCRIPTION OF THE DRAWINGS

The following is a brief description of the drawings, which are presented for the purpose of illustrating the exemplary embodiments disclosed herein and not for the purpose of limiting the same.

FIG. 16A is an exploded view of a schematic of a second apparatus for nail penetration testing;

FIG. 16B is a non-exploded view of the schematic shown in FIG. 16A;

DETAILED DESCRIPTION

Thermal management in batteries, for example preventing thermal runaway in batteries, especially batteries that include a large plurality of electrochemical cells, is a difficult problem, as a cell adjacent to a cell experiencing a thermal runaway can absorb enough energy from the event to cause it to rise above its designed operating temperatures, triggering the adjacent cells to also enter into thermal runaway. This propagation of an initiated thermal runaway event can result in a chain reaction in which cells enter into a cascading series of thermal runaways, as the cells ignite adjacent cells. It has been particularly difficult to achieve effective thermal management properties in very thin sheets, for example sheets that have a total thickness of 30 millimeters (mm) or less, or 20 mm or less, or 15 mm or less, or 10 mm or less, or 8 mm or less, or 6 mm or less. Thin sheets are increasingly desired to reduce article size and weight, and to conserve material.

The inventors hereof have found that a composite thermal management sheet that includes a silicone foam and a reactive filler composition can be used to prevent or decrease the intensity of such cascading thermal runaway events. The reactive filler composition is formulated so that upon exposure to a heat source, the filler composition first produces and absorbs water, which can mitigate heat transfer to an adjoining cell. In an aspect, the water can be trapped, or can be desorbed, to provide recycling of the water. In another aspect, upon continued exposure to heat, the flexible silicone layer and the reactive filler composition can form a thermal barrier layer that can further mitigate heat transfer to an adjoining cell.

It has unexpectedly been found that use of a reactive filler composition is especially useful in the manufacture of composite thermal management sheets that are very thin, i.e., 30 mm or less, or 20 mm or less, or 15 mm or less, or 10 mm or less, or 8 mm or less, or 6 mm or less, and that have good thermal insulation properties. The composite thermal management sheet can have additional advantageous properties, for example good puncture resistance. The composite thermal management sheet can be subjected to multiple heating and cooling cycles, and still provide good thermal insulation. The composite thermal management sheet can further provide pressure management to the electrochemical cells and batteries. The composite thermal management sheet can be used in various sites in batteries to prevent thermal runaway. The composite thermal management sheet can further improve the flame resistance of batteries.

Figure 1:
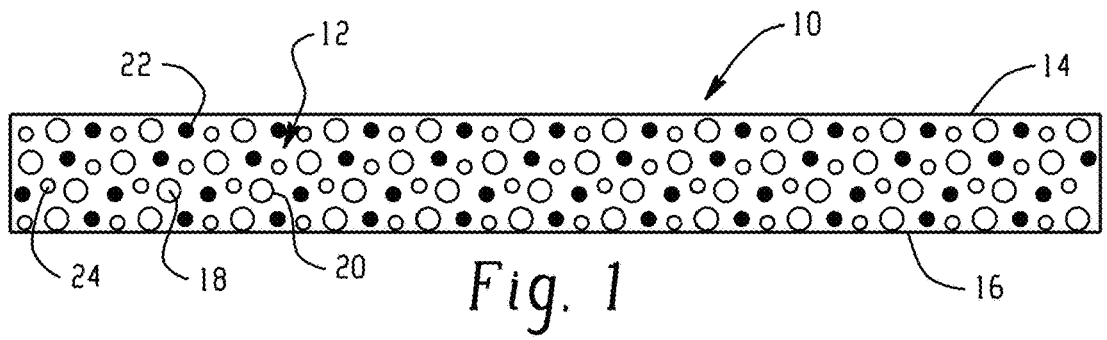
FIG. 1 is a schematic, cross-sectional illustration of an aspect of a composite thermal management sheet.

As stated above, the composite thermal management sheet comprises a flexible and porous layer, and at least two fillers having specific properties. An aspect is shown in FIG. 1, where the composite thermal management sheet 10 comprises a flexible silicone foam layer 12 having a first outer surface 14 and an opposite second outer surface 16. Although shown as flat, one or both or all of the outer surfaces can be contoured to provide better fit with a surface of an electrochemical cell.

Flexible silicone, foam layer 12 further includes a plurality of openings, i.e., pores 18. The pores are defined by an inner surface 20 of the flexible foam material. The pores can be interconnected or discrete. A combination of interconnected and discrete pores can be present. The pores can be wholly contained within the sheet, or at least a portion of the pores can be open to a surface of the sheet, allowing communication with the surrounding environment. In an aspect, at least a portion of the pores are interconnected and at least a portion of the pores are open, allowing passage of air, water, water vapor, or the like from first outer surface 14 to the opposite second outer surface 16, referred to herein as an "open-celled foam". In another aspect, the foam may be a "closed cell foam", where the pores may or may not interconnect, and are substantially not open to a surface of the sheet, or are completely closed, such that the sheet does not allow substantial passage of air, water, water vapor, or the like from one outer surface to the other outer surface. In an aspect, the foam is a substantially closed-cell foam, or a completely closed-cell foam.

With further reference to FIG. 1, the filler composition comprises two or more different fillers 22, 24 distributed within the flexible silicone foam layer 12. The fillers can be distributed essentially uniformly, or as a gradient, for example increasing from a first outer surface 14 in the direction of second outer surface 16. As used herein, the phrase "disposed within" can mean that the reactive filler composition is distributed within the matrix of the silicone foam layer as shown in FIG. 1. Further as used herein, the phrase "disposed within" can mean that the reactive filler composition can be located within a pore 18 of the silicone foam layer, for example coating an inner surface 20 of the flexible foam material, or located within the pore in particulate form. A portion of the number of pores in the silicone foam layer can contain the reactive filler composition, or essentially all, or all of the pores can contain the reactive filler composition. Each pore containing the reactive filler composition can independently be partially filled, essentially fully filled, or fully filled.

The silicone foam is selected to be inert to the ordinary operating conditions of a battery such as a lithium-ion battery, to act as a carrier for the reactive filler composition, and to provide a silicon source for formation of a thermal barrier layer as described in more detail below. Various silicone foams are known in the art, and can be used. In an aspect, the silicone foam comprises a poly(dialkyl siloxane), for example a poly(dimethyl siloxane).

The reactive filler composition includes at least two different fillers having specific properties. As will be understood from the discussion below, the term "reactive" as used in connection with the filler composition includes both chemical reactions, for example breaking an existing chemical bond or forming a new chemical bond, and physical processes such as hydrogen bond breaking and formation. The type and amount of each of the at least two fillers in the reactive filler composition are first selected to generate water upon exposure to heat. As used herein "generating water" can refer to release of water, for example from a hydrate, or formation of water, e.g., by a chemical reaction process. Furthermore, the water generated can be in the form of a liquid or water vapor. As used herein "water" accordingly includes liquid water, water vapor, or a combination thereof "Heat" as used herein means heat above the ordinary operating temperature of the battery, and includes heat produced by a flame or contact with a flame. Such temperatures can be 100° C. or higher, or 200° C. or higher, or 300° C. or higher, or 500° C. or higher. Without being bound by theory, it is believed that generating water from the reactive filler composition can provide thermal barrier properties by absorbing heat, redistributing heat, or by vaporization of water.

The type and amount of each of the at least two fillers can further be selected to form a thermal barrier layer in situ upon exposure to heat, absorb water, or both. As used herein, a "thermal barrier layer" is a layer that is physically distinct, chemically distinct, or both physically and chemically distinct from the composite thermal management sheet, and that can provide a conductive or convective thermal barrier to heat, flame, or both. "Thermal barrier layer" is inclusive of char layers as that term can be used in the art, or a water-swelled polymer. The inventors hereof have found that without in-situ formation of a thermal barrier layer, the transport of hot air and water vapor through the flexible porous layer, including through the cell walls, can produce rapid heat transfer to the adjoining cell. Without being bound by theory, it is believed that with the in situ formation of a thermal barrier layer, hot air and water produced on the failed cell side of the composite thermal management sheet is constrained to the failed cell surface, or internally within the composite thermal management sheet, or both. This can protect the adjoining cell via pressure generation of the thermal barrier layer, as well as by blocking convective heat transfer, conductive heat transfer, or both into the adjoining cell.

The at least two fillers are preferably in a particulate form to allow easy incorporation into the silicone foam during manufacture thereof. As described above, the reactive filler composition in particulate form can be located within the silicone matrix of the silicone foam layer, within a pore of the silicone foam layer, or both. A portion of the number of pores in the silicone foam layer can contain the particulate reactive filler composition, or essentially all, or all of the pores can contain the particulate reactive filler composition. Each pore containing the particulate reactive filler composition can independently be partially filled, essentially fully filled, or fully filled. In an aspect in which particles of the reactive filler composition are large relative to a diameter of the pore, or the pore is essentially or fully filled with a plurality of smaller particles, movement of the particles within the pore can be restricted. In this aspect, the particulate reactive filler composition can be located in the pores during manufacture of the layer (for example, by including the particulate reactive filler composition in the composition used to form the silicone foam layer), or the particulate reactive filler composition can be impregnated into the pores after manufacture of the silicone foam layer using a suitable liquid carrier, vacuum, or other known method.

A combination of different reactive filler compositions, including different types, forms, or placements can be used. For example, a reactive filler composition in particulate form within a pore of the silicone foam layer can be used in combination with a particulate reactive filler composition distributed within the silicone foam layer.

The reactive particulate or particles can be of any shape, irregular or regular, for example approximately spherical, spherical, or plate-like. In an important feature, most, essentially all, or all, of the particles have a largest dimension less than the thickness of the layer or the pore in which they are located, to provide a smooth surface to the layer. The particular diameters used therefore depend on the location of the particles. Bi-, tri-, or higher multimodal distributions of particles can be used. For example, when filler particles are present within the matrix of the silicone foam layer and within the pores of the silicone foam layer, a bimodal distribution of particles can be present.

The at least two fillers are different from each other, and are at least two of aluminum trihydrate, ammonium nitrate, borax, hydrous sodium silicate, magnesium hydroxide, magnesium carbonate hydroxide pentahydrate, magnesium phosphate tribasic octahydrate, zinc borate, a superabsorbent polymer, or waterglass.

Fillers that can generate water upon exposure to heat include various hydrated mineral fillers, such as aluminum trihydrate (also known as aluminum trihydroxide or ATH), borax (sodium tetraborate pentahydrate), hydrous sodium silicate, magnesium carbonate hydroxide pentahydrate, magnesium phosphate tribasic octahydrate; a superabsorbent polymer; and waterglass. A combination of the foregoing can be used. It is to be understood that hydrated mineral fillers and waterglass can be represented by different chemical formulas, and the foregoing are inclusive of the various formulas. Certain hydrated mineral fillers known for use as phase change materials that release water at lower temperatures (e.g., less than 100° C., or less than 200° C.) are not used, to prevent phase change at ordinary operating temperatures.

Fillers that can participate in formation of a thermal barrier layer, absorb water, or both include various sodium, silicon- and boron-containing mineral fillers. A single filler can both generate water and participate in formation of the thermal barrier layer. Exemplary fillers of this type can include ATH, ammonium nitrate, borax, hydrous sodium silicate, magnesium hydroxide, magnesium carbonate hydroxide pentahydrate, magnesium phosphate tribasic octahydrate, zinc borate, a superabsorbent polymer, or a combination thereof.

In a first aspect, the reactive filler composition includes ATH and zinc borate. This combination produces water upon exposure to a heat source. The water can expand the silicone foam to provide a counterpressure. Without being bound by theory, generating water can absorb the heat to prevent thermal runaway. Further heat can be absorbed by conversion of liquid water to water vapor. The heat capacity of the ATH and zinc borate can further contribute to heat absorption. A porous thermal barrier layer can form upon exposure to the heat source.

In a second aspect, first and second fillers are selected to both generate water and to also produce a borosilicate glass thermal layer in situ upon exposure to heat. In this aspect, the first and second fillers can include a combination of borax and hydrous sodium silicate. The borax and the hydrous sodium silicate can generate water, and can provide sodium and boron to form the borosilicate glass. Decomposition of the flexible silicon layer can provide silicon to form the borosilicate glass. Also, in this aspect, a combination of ATH, zinc borate, and hydrous sodium silicate can be used. Without being bound by theory, it is believed that during exposure to the heat source, the composite thermal management sheet absorbs heat due to the heat capacity of the silicone and borax; the heat of water production and any vaporization from both the borax; and the endothermic formation of borosilicate glass. A thermal barrier layer can form and expand upon exposure to the heat source.

Advantageously, a combination of borax and zinc borate can be used in the reactive filler composition. It has surprisingly been found that when borax and zinc borate are used, the borosilicate glass thermal barrier layer is both expanded and deformed to form a flexible yet hard layer. The deformation can act as a normal force against the adjacent expanding battery cell, which can decrease or prevent damage caused by an expanding cell that has entered thermal runaway. Without being bound by theory, it is believed that the normal force generation through the pressure of expansion as well as the shape of the char layer can further block convective and conductive heat transfer.

In these aspects, the components and concentrations of the reactive filler composition can be selected to provide staged release of water, thus providing continuous thermal abatement. For example, it has been found that during hot plate testing of a filler composition that includes a combination of borax and zinc borate, heat from the hot plate diffuses into the flexible foam, and generates water vapor first at 140° C. from the borax, and then at 340° C. from the zinc borate. Again without being bound by theory, it is believed that the initial release of water from borax initiates and maintains the generation of the thermal barrier layer, and affects the thickness of the ultimate borosilicate glass thermal barrier layer, and thus the pressure exerted. This process also absorbs heat due to the heat capacity of the silicone, zinc borate and borax; the heat of water production and any vaporization from both the zinc borate and borax; and the endothermic formation of borosilicate glass. Furthermore, the deformation of the composite layer provides a resistance to heat transfer.

In another example of staged water release, a reactive filler composition that includes borax and aluminum trihydrate can generate water vapor first at 140° C. from the borax, and then at 220° C. from the from the decomposition of the ATH.

Another reactive filler composition that can provide a staged water release can include borax, ATH, and zinc borate. This combination can provide a 3-stage water generation system that generates water at 140° C. from the borax, at 220° C. from the ATH, and at 340° C. from the zinc borate.

In a third aspect, the reactive filler composition is further formulated to absorb water that can be trapped or released (recycled). In this aspect, the absorption of water provides an additional mechanism to delay, reduce, or block convective heat transport. Water absorption can further contribute to expansion of the composite thermal conductive layer, to provide additional pressure abatement. In this aspect, the reactive filler composition includes a filler that generates water upon exposure to heat and a filler that can absorb the generated water. The water can be permanently absorbed (i.e., trapped), or releasably absorbed (desorbed), allowing recycling of the water.

In this aspect, the filler that generates water can include borax, ATH, magnesium hydroxide pentahydrate (MDH), or a combination thereof.

A filler that can absorb the generated water includes superabsorbent polymer (SAP). Under some conditions the SAP absorbs and traps water, where the trapped water is only released by decomposition of the SAP. Under other conditions the SAP can absorb and release water without decomposition of the SAP. Superabsorbent polymers are known in the art, such as the hydrolyzed product of starch grafted with acrylonitrile homopolymer or copolymer, such as a hydrolyzed starch-polyacrylonitrile); starch grafted with acrylic acid, acrylamide, polyvinyl alcohol (PVA) or a combination thereof, such as starch-g-poly(2-propeneamide-co-2-propenoic acid, sodium salt); hydrolyzed starch-polyacrylonitrile ethylene-maleic anhydride copolymer; cross-linked carboxymethylcellulose; acrylate homopolymers and copolymers thereof such as a poly(sodium acrylate) and a poly (acrylate-co-acrylamide), specifically a poly(sodium acrylate-co-acrylamide); hydrolyzed acrylonitrile homopolymers; homopolymers and copolymers of 2-proenoic acid, such as poly(2-propenoic acid, sodium salt) and poly(2-propeneamide-co-2-propenoic acid, sodium salt) or poly(2-propeneamide-co-2-propenoic acid, potassium salt); a cross-linked modified polyacrylamide; a polyvinyl alcohol copolymer, a cross-linked polyethylene oxide; and the like. A combination of two or more different SAPs can be used.

The SAP is preferably an electrolyte, such as a salts of poly(acrylate), for example poly(sodium acrylate). The SAP can have a swelling ratio of 15:1 to 1000:1. Higher ratios are preferred. Upon absorbing water, the SAP traps the water and expands. The expansion can act as a normal force against the adjacent expanding battery cell, which can decrease or prevent damage caused by an expanding cell that has entered thermal runaway.

The SAP can optionally be hydrated with water (via spraying, dipping, or other method) in water. For example, the SAP can be hydrated before being incorporated into the silicone foam, or the composite thermal management layer with the SAP can be immersed in water at room temperature water for 24 hours.

Without being bound by theory, it is believed that in this aspect, water is first generated from a filler as the temperature increases (optionally at a variety of temperatures) as described above. The water is absorbed by the SAP. In an aspect, the water absorbed by the SAP is trapped and not released. In another aspect, the water absorbed by the SAP absorbs heat and is then released, exiting the system containing the electrochemical cell, or being absorbed by other dehydrated SAP at a different location in composite thermal management sheet. Ultimately, borosilicate glass can be formed as a continuous and flexible thermal barrier layer.

Another filler that can be used to absorb water is waterglass. As is known in the art, waterglass is soluble in water, and comprises sodium oxide ($Na_2O$) and silicon dioxide (silica, $SiO_2$). Under some conditions, the waterglass can absorb water to trap it, or absorb water and release it.

In still another aspect, the reactive filler composition can be formulated to produce waterglass in situ, without decomposition of the flexible silicone layer. In this aspect, the fillers can include borax and hydrous sodium silicate. Other components can be present, such as aluminum trihydrate, magnesium hydroxide, magnesium carbonate hydroxide pentahydrate, or ammonium nitrate, or the like, or a combination thereof. Without being bound by theory, it is believed that heat is diffused into the silicone foam, generating water at a variety of temperatures depending on the combination of water generating fillers used. The remaining ions from the decomposition of the water generating filler can form a Lewis acid or a Lewis base, and react with the hydrous sodium silicate to form waterglass. The water can be released to be recycled. Alternatively, as the water evaporates due to thermal heating, the waterglass solution can solidify to provide a glassy solid that can act as a heat transfer barrier layer inside or outside the silicone foam.

The composite thermal management sheet can be manufactured from silicone foam-forming compositions by methods known in the art. The reactive filler composition can be incorporated into the silicone foam-forming composition before the reactive filler composition is foamed and cured. For example, suitable silicone foams can be produced by reaction foaming and cure of silicone foam-forming compositions that includes a polysiloxane having terminal unsaturation, for example vinyl groups and a polysiloxane having terminal hydride groups. The polysiloxanes for formation of the silicone foam can have a viscosity of 100 to 1,000,000 poise at 25° C. The polysiloxanes for formation of the silicone foam can have chain substituents such as hydride, methyl, ethyl, propyl, vinyl, phenyl, and trifluoropropyl and in addition to terminal hydride and vinyl groups, hydroxyl, alkoxy, acyloxy, allyl, oxime, aminoxy, isopropenoxy, epoxy, mercapto groups, or other known reactive terminal groups. It is also possible to have several polysiloxane base polymers with different functional or reactive groups in order to produce the desired foam. The silicone foams can also be produced using several polysiloxanes having different molecular weights (e.g., bimodal or trimodal molecular weight distributions) as long as the viscosity of the combination lies allows ready incorporation of the reactive filler composition and ready manufacture.

The silicone foam-forming composition can further include a catalyst, for example a catalyst containing a noble metal, preferably platinum. The catalyst can be deposited onto an inert carrier, such as silica gel, alumina, or carbon black. Various platinum catalyst inhibitors can also be present to control the kinetics of the blowing and curing reactions in order to control the porosity and density of the silicone foams. Examples of such inhibitors include polymethylvinylsiloxane cyclic compounds and acetylenic alcohols. These inhibitors should not interfere with the foaming and curing in such a manner that destroys the foam. A chemical blowing agent can be present.

In the production of silicone foams, the reactive components of the silicone foam-forming composition can be formulated in two parts, one part ("Part A") containing the polysiloxane having terminal unsaturation and the reactive filler composition, and if used, the catalyst, the inhibitor, and a chemical blowing agent; and the other part ("Part B") containing the polysiloxane having hydride groups. The parts can be metered, mixed, and cast, for example into a mold or a continuous coating line. The foaming and curing then occurs either in the mold or on the continuous coating line. In another method of production, the reactive components of the silicone foam-forming composition can be introduced into an extruder together with the reactive filler composition and a chemical blowing agent, a physical blowing agent, or other additives if used. The catalyst can then be metered into the extruder to start the foaming and curing reaction. The use of physical blowing agents such as liquid carbon dioxide or supercritical carbon dioxide in conjunction with chemical blowing agents such as water can give rise to foam having much lower densities.

Optionally, the composite thermal management sheet can be immersed in water for a period of time, for example, 24 hours, to imbibe water into the composite thermal management sheet. The high heat capacity of liquid water can contribute to significantly delaying heat transfer from one surface of the composite thermal management sheet to the other surface of the composite thermal management sheet.

As stated above, the amount of each filler in the reactive filler composition is adjusted to provide the desired degree of water generation and thermal barrier formation. Part A of the silicone foam-forming composition can include 10 to 80 weight percent (wt %) or 20 to 70 wt %, or 30 to 60 wt % of the reactive filler composition, based on the total weight of Part A, with the remainder of the Part A composition being the other components of Part A.

Where the reactive filler composition includes ATH and zinc borate, Part A can include 5 to 40 wt %, or 10 to 40 wt %, or 20 to 40 wt % of ATH and 5 to 40 wt %, or 10 to 40 wt %, or 20 to 40 wt % of zinc borate, each based on the total weight of Part A, with the remainder of the Part A composition being the other components of Part A.

Where the reactive filler composition includes borax and hydrous sodium silicate, Part A can include 5 to 50 wt %, or 10 to 40 wt %, or 20 to 40 wt % of borax and, 5 to 30 wt %, or 10 to 30 wt % of hydrous sodium silicate, each based on the total weight of Part A, with the remainder of the Part A composition being the other components of Part A.

Where the reactive filler composition includes ATH, hydrous sodium silicate, and zinc borate, Part A can include 5 to 30 wt %, or 10 to 20 wt % of ATH, 5 to 30 wt %, or 10 to 30 wt % of hydrous sodium silicate, and 5 to 40 wt %, or 10 to 30 wt %, or 10 to 30 wt % of 20 to 30% zinc borate, each based on the total weight of Part A, with the remainder of the Part A composition being the other components of Part A.

Where the reactive filler composition includes borax and zinc borate borax can be present in an amount of 5 to 45 wt %, or 10 to 40 wt %, preferably 15 to 35 wt %, and most preferably 20 to 30 wt %, and zinc borate can be present in an amount of 5 to 40 wt %, or 10 to 40 wt %, preferably 15 to 35 wt %, and most preferably 20 to 30 wt %, each based on the total weight Part A, with the remainder of the Part A composition being the other components of Part A.

When SAP is present in the reactive filler composition, Part A can include the SAP in an amount of 1 to 60 wt %, or 5 to 35 wt %, or 10 to 35 wt. %, each based on the total weight of Part A, with the remainder of the Part A composition being one or more different fillers and the other components of Part A.

The composite thermal management sheet can include other additives as is known in the art, for example a processing aid, an antioxidant, an antiozonant, an ultraviolet (UV) or heat stabilizer, a dye, a pigment, a flame retardant (e.g., an organic phosphorus-containing compound), a flame retardant synergist (e.g., antimony oxide), or a combination thereof. A thermally insulating filler can be present to increase thermal insulation, heat absorption or heat deflection properties. Exemplary thermally insulating fillers include ceramics such as silica, talc, calcium carbonate, clay, mica, vermiculite, or the like, or a combination thereof. In another aspect, a thermally conducting filler can be present to increase the thermal conductivity properties, such as boron nitride, aluminum nitride, or the like, or a combination thereof. A reinforcing particulate filler can be present. Exemplary reinforcing particulate materials include lignin, carbon black, talc, mica, silica, quartz, metal oxide, glass microspheres (e.g., cenospheres, glass microspheres, for example borosilicate microspheres, or a combination thereof), polyhedral oligomeric silsesquioxane, substituted polyhedral oligomeric silsesquioxane, or a combination thereof. These additives can be added at the same time as the reinforcing filler composition.

The silicone foam-forming composition can be foamed and cured in the presence of reinforcing fibers to provide fibrous reinforcement. The reinforcing fibers can include polyester, oxidized polyacrylonitrile, carbon, silica, polyaramid, polycarbonate, polyolefin, rayon, nylon, fiberglass (e.g., E glass, S glass, D glass, L glass, quartz fibers, or a combination thereof), high density polyolefin, ceramics, acrylics, fluoropolymer, polyurethane, polyamide, polyimide, or the like, or a combination thereof. The reinforcing fibers can be in any form, such as a woven or nonwoven mat or tape. The mat or tape can have a thickness of, for example, 0.005 to 10 mm, or 0.05 to 8 mm, or 0.25 to 6 mm, or 0.5 to 10 mm, or 0.25 to 10 mm, or 0.5 to 10 mm, or 1 to 10, or 1 mm to 6 mm. A combination a reinforcing particulate material and reinforcing fibers can be used.

The composite thermal management sheet can have a thickness of 0.5 to 30 mm, or 0.5 to 20 mm, or 0.5 to 15 mm, or 0.5 to 10 mm, or 0.5 to 8 mm, or 1 to 6 mm, or 1 to 5 mm, or 1 to 4.5 mm, or 1 to 4 mm, or 1 to 3.5 mm, or 1 to 3 mm, or 1 to 2.5 mm. The disclosed composite thermal management sheet can provide equivalent or improved thermal resistance at thinner thickness compared to competing technologies for flame resistant sheets. In some respects, for example where the thermal barrier layer is formed, the thickness of the composite thermal management layer is preferably 1.5 to 30 mm, or 1.5 to 20 mm, or 1.5 to 15 mm, or 1.5 to 10 mm, or 1.5 to 8 mm, or 1.5 to 6 mm, or 1.5 to 5 mm, or 1.5 to 4.5 mm, or 1.5 to 4 mm, or 1.5 to 3.5 mm, or 1.5 to 3 mm, or 1.5 to 2.5 mm. A thicker composite thermal management sheet can provide greater pressure generation, deformation, and borosilicate glass generation, and thus improved thermal delay. In this aspect the thickness of the composite thermal management layer is preferably 1.5 to 30 mm, or 1.5 to 20 mm, or 1.5 to 15 mm, or 1.5 to 10 mm, or 1.5 to 8 mm, or 1.5 to 6 mm, or 2 to 30 mm, or 2 to 20 mm, or 2 to 15 mm, or 2 to 10 mm, or 2 to 8 mm, or 2 to 6 mm, or 3 to 0 mm, or 3 to 8 mm, or 3 to 6 mm.

In an aspect, the composite thermal management sheet can have a density of 5 to 65 pounds per cubic foot (lb/ft$^3$) (1,041 kilograms per cubic meter (kg/m$^3$)), or 5 to 55 lb/ft$^3$ (881 kg/m$^3$), or 10 to 25 lb/ft$^3$ (400 kg/m$^3$). In an aspect, the foam has a density of 5 to 30 lb/ft$^3$ (80 to 481 kg/m$^3$). The composite thermal management sheet can have a void volume content of 5 to 99%, preferably greater than or equal to 30%, based upon the total volume of the foam.

The composite thermal management sheet is flexible, and can maintain its elastic behavior over many cycles on compression deflection over the life of the battery, properties reflected by compressive force deflection and compression set of the foam. Foams with good compression set resistance provide cushioning, and maintain their original shape or thickness under loads for extended periods. In an aspect, the composite thermal management sheet has a compression force deflection of 0.2 to 125 pounds per square inch (psi) (1 to 862 kilopascals (kPa)), or 0.25 to 20 psi (1.7 to 138 kPa), or 0.5 to 10 psi (3.4 to 68.90.5 kPa), each at 25% deflection and determined in accordance with ASTM D3574-17. The composite thermal management sheet can have a compression set of 0 to 15%, or 0 to 10%, or 0 to 5%, determined in accordance with ASTM D 3574-95 Test D at 70° C.; or a density of 5 to 65 lb/ft$^3$ (80 to 1,041 kg/m$^3$), or 6 to 20 lb/ft$^3$ (96 to 320 kg/m$^3$), or 8 to 15 lb/ft$^3$ (128 to 240 kg/m$^3$).

In an aspect, the composite thermal management sheet is used as a single layer. Multiple single layers can be stacked, however, and used as a single layer. Other layers can be used in combination with the composite thermal management sheet, for example a flame retardant layer, a nonporous elastomeric barrier layer, an adhesive layer, or the like, or a combination thereof. However, one advantage of the composite thermal management sheet is that a single sheet used alone can be effective without other layers even at thicknesses as low as 1 to 30 mm, or 1 to 20 mm, or 1 to 15 mm, or 1 to 10 mm, or 1 to 8 mm, or 1 to 6 mm.

If used, the flame retardant layer can include a flame retardant inorganic material such as boehmite, aluminum hydroxide, magnesium hydroxide, an intumescent material, or a combination thereof. The intumescent material can include an acid source, a blowing agent, and a carbon source. Each component can be present in separate layers or as an admixture, preferably an intimate admixture. For example, the intumescent material can include an acid source, a blowing agent, and a carbon source. For example, as the temperature reaches a value, for example, of 200 to 280° C., the acidic species (for example, of the polyphosphate acid) can react with the carbon source (for example, pentaerythritol) to form a char. As the temperature increases, for example, to 280 to 350° C., the blowing agent can then decompose to yield gaseous products that cause the char to swell.

The acid source can include, for example, an organic or an inorganic phosphorous compound, an organic or inorganic sulfate (for example, ammonium sulfate), or a combination thereof. The organic or inorganic phosphorous compound can include an organophosphate or organophosphonate (for example, tris(2,3-dibromopropyl)phosphate, tris(2-chloroethyl)phosphate, tris(2,3-dichloropropyl)phosphate, tris(1-chloro-3-bromoisopropyl) phosphate, bis(1-chloro-3-bromoisopropyl)-1-chloro-3-bromoisopropyl phosphonate, polyaminotriazine phosphate, melamine phosphate, triphenyl phosphate, or guanylurea phosphate); an organophosphite ester (for example, trimethyl phosphite, or triphenyl phosphite); a phosphazene (for example, hexaphenoxycyclotriphosphazene); a phosphorus-containing inorganic compound (for example, phosphoric acid, phosphorus acid, a phosphite, urea phosphate, an ammonium phosphate (for example, ammonium monohydrogen phosphate, ammonium dihydrogen phosphate, or ammonium polyphosphate)); or a combination thereof.

The blowing agent can include an agent that decomposes (for example, into smaller compounds such as ammonia or carbon dioxide) at a temperature of greater than or equal to 120° C., for example, at 120 to 200° C., or at 130 to 200° C. The blowing agent can include a dicyandiamide, an azodicarbonamide, a melamine, a guanidine, a glycine, a urea (for example, a urea-formaldehyde resin or a methylolated guanylurea phosphate), a halogenated organic material (for example, a chlorinated paraffin), or a combination thereof.

The intumescent material can include a carbon source. The silicone foam layer can function as the carbon source. The carbon source can include dextrin, a phenol-formaldehyde resin, pentaerythritol (for example, a dimer or trimer thereof), a clay, a polymer (for example, polyamide 6, an amino-poly(imidazoline-amid), or polyurethane), or a combination thereof. The amino-poly(imidazoline-amid) can include repeating amide linkages and imidazoline groups.

The intumescent material can optionally further include a binder. The binder can include an epoxy, a polysulfide, a polysiloxane, a polysilarylene, or a combination thereof. The binder can be present in the intumescent material in an amount of less than or equal to 50 wt %, or 5 to 50 wt %, or 35 to 45 wt %, based on the total weight of the intumescent material. The binder can be present in the intumescent material in an amount of 5 to 95 wt %, or 40 to 60 wt % based on the total weight of the intumescent material.

The intumescent material can optionally include a synergistic compound to further improve the flame retardance of the intumescent material. The synergistic compound can include a boron compound (e.g., zinc borate, boron phosphate, or boron oxide), a silicon compound, an aluminosilicate, a metal oxide (e.g., magnesium oxide, ferric oxide, or aluminum oxide hydrate (boehmite)), a metal salt (e.g., alkali metal or alkaline earth metal salts of organosulfonic acids or alkaline earth metal carbonates), or a combination thereof. Preferred synergistic combinations include phosphorus-containing compounds with at least one of the foregoing.

The flame retardant layer can further include a char-forming agent, preferably a lignin, boehmite, clay nanocomposite, expandable graphite, pentaerythritol, cellulose, nanosilica, ammonium polyphosphate, lignosulfonate, melamine, cyanurate, zinc borate, huntite, hydromagnesite, or a combination thereof. Without being bound by theory, similar to the intumescent material, it is believed that the char-forming agent can reduce the spread of flames using two energy absorbing mechanisms, including forming a char and then swelling the char.

The flame retardant layer can further include a polymer binder, for example, a silicone, a polyurethane, an ethylene-vinyl acetate, an ethylene-methyl acrylate, an ethylene-butyl acrylate, or a combination thereof. The flame retardant layer can have a thickness of 0.1 to 2 mm, 0.5 to 1.5 mm, or 0.8 to 1.1 mm.

If used, the nonporous elastomeric barrier layer comprises an elastomer having a permeability coefficient for water of less than 20 g-mm per m$^2$ per day, or less than 10 g-mm per m² per day, or less than 5 g-mm per m² per day, each measured at 25° C. and 1 atmosphere; or a tensile stress at 100% elongation of 0.5 to 15 megaPascals measured at 21° C. in accordance with ASTM 412; or a combination thereof. The nonporous elastomeric barrier layer can have a thickness of 0.25 to 1 mm or 0.4 to 0.8 mm.

The nonporous elastomeric barrier layer can include an elastomeric material that is hydrophobic, to prevent water or water vapor transmission. For example, the elastomeric barrier layer can include a thermoplastic elastomer (TPE), provided that it has the preferred hydrophobicity (lack of water or water vapor transmission). Classes of TPEs include styrenic block copolymers (TPS or TPE-s), (TPO or TPE-o), thermoplastic vulcanizates (TPV or TPE-v), thermoplastic polyurethane, thermoplastic copoly esters (TPC or TPE-E), thermoplastic polyamides (TPA or TPE-A), and others.

Specific examples of elastomeric materials that can be used include an acrylic rubber, butyl rubber, halogenated butyl rubber, copolyester, epichlorohydrin rubber, ethylene-acrylic rubber, ethylene-butyl acrylic rubber, ethylene-diene rubber (EPR) such as ethylene-propylene rubber, ethylene-propylene-diene monomer rubber (EPDM), ethylene-vinyl acetate, fluoroelastomer, perfluoroelastomer, polyamide, polybutadiene, polychloroprene, polyolefin rubber, polyisoprene, polysulfide rubber, natural rubber, nitrile rubber, low density polyethylene, polypropylene, thermoplastic polyurethane elastomer (TPU), silicone rubber, fluorinated silicone rubber, styrene-butadiene, styrene-isoprene, vinyl rubber, or a combination thereof. In an aspect the nonporous elastomeric barrier layer comprises ethylene-propylene-diene monomer rubber, polychloroprene, or a combination thereof.

An adhesive layer can be present to adhere a composite thermal management sheet to another composite thermal management sheet, another type of layer, or to a component of the cell array or batter. A wide variety of adhesives are known in the art can be used in the composite thermal management sheet. The adhesive can be selected for ease of application and stability under the operating conditions of the battery. Each adhesive layer can the same or different, and be of the same or different thickness. Suitable adhesives include a phenolic resin, an epoxy adhesive, a polyester adhesive, a polyvinyl fluoride adhesive, an acrylic or methacrylic adhesive, or a silicone adhesive, preferably an acrylic adhesive or a silicone adhesive. In an aspect, the adhesive is a silicone adhesive. Solvent-cast, hot-melt, and two-part adhesives can be used. Each of the adhesive layers can independently have a thickness of 0.00025 to 0.010 inches (0.006 to 0.25 mm), or 0.0005 to 0.003 inches (0.01 to 0.08 mm).

When the composite thermal management sheet includes an adhesive layer, the composite thermal management sheet can further include a release layer. By "release layer" is meant any single or composite layer including a release coating, optionally supported by one or more additional layers including a release liner. The thickness of each of the release layers can be 5 to 150 micrometers (μm), 10 to 125 μm, 20 to 100 μm, 40 to 85 μm, or 50 to 75 μm.

Figure 2:
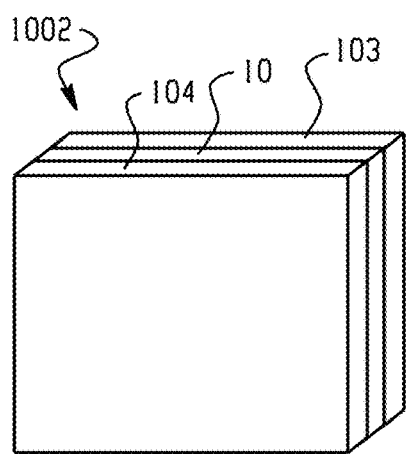
FIG. 2 is a schematic drawing of an aspect of a composite thermal management sheet located in between two cells.
Figure 3:
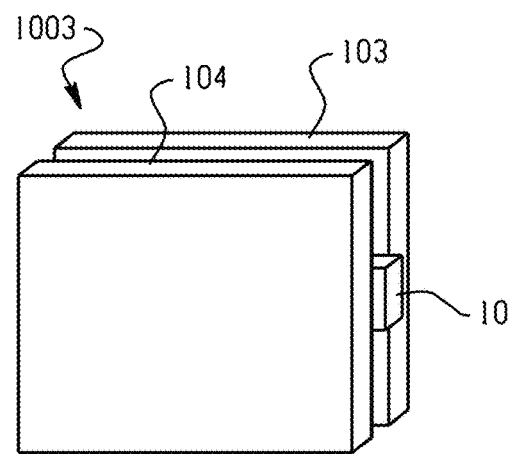
FIG. 3 is a schematic drawing of an aspect of a composite thermal management sheet located in between two electrochemical cells.

The composite thermal management sheet is disposed on an electrochemical cell to provide a cell assembly for a battery. The cells can be lithium-ion cells, in particular, prismatic, cylindrical, or pouch cells. FIG. 2 illustrates an aspect of the positioning of the composite thermal management sheet in a cell assembly 1002. and FIG. 3 illustrates another aspect of the positioning of the composite thermal management sheet in a cell assembly 1003. FIG. 2 and FIG. 3 illustrate that the composite thermal management sheet 10 can be located between a first cell 103 and a second cell 104. FIG. 2 illustrates that the composite thermal management sheet 10 can be approximately the same size as the height and width of the cells 103, 104. FIG. 3 illustrates that the composite thermal management sheet 10 can be smaller than the respective cells 103, 104. Also as shown in FIG. 3 it is also possible for the composite thermal management sheet 10 to extend past an edge of an electrochemical cell 103, 104. A composite thermal management sheet extending past an edge of an electrochemical cell can wrap around and cover at least another portion or all of another surface of the cell.

Figure 4:
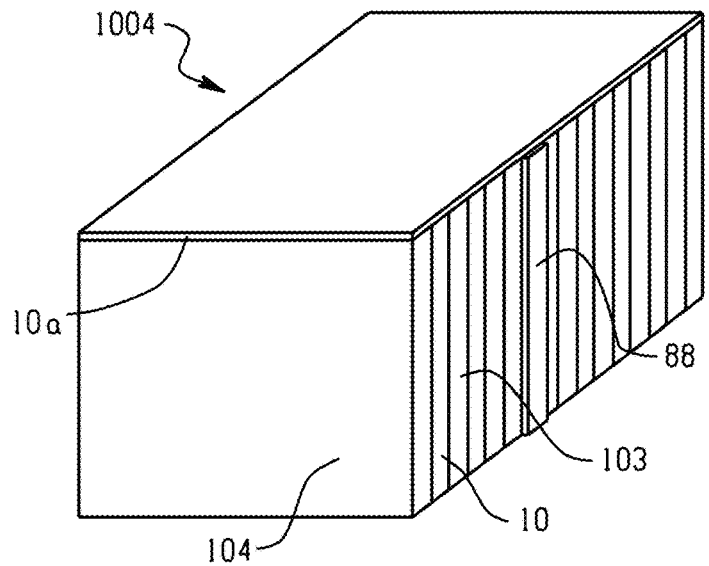
FIG. 4 is a schematic drawing of an aspect of a composite thermal management sheet located in a cell array.

FIG. 4 illustrates that multi-cell assembly 1004 can include more than two cells 103, 104 with composite thermal management sheet 10 located in between the respective cells 103, 104. The cells can be lithium-ion cells, in particular pouch cells. FIG. 4 illustrates that an assembly 1004 for a battery can comprise more than two cells (e.g., 103, 104) with composite thermal management sheet 10 located in between the respective cells 103, 104 and each of the other cells. In an aspect, two to ten composite thermal management sheets can be disposed on a cell or in a cell array during manufacture of the assembly 1004 for a battery. For example, two to ten composite thermal management sheets can be disposed on the interior, e.g., facing the electrodes, or exterior, facing outside of the battery. Two to ten fire-resistant composite thermal management sheets can be disposed on or adhered to a cell or pouch of a pouch cell, or both. Of course, one or more than ten of the composite thermal management sheets can be present depending on the number of cells and cell arrays. FIG. 4 further illustrates composite thermal management sheet 10a disposed on an exterior of assembly 1004 for a battery, to face outside of a battery.

In an aspect, at least a portion of an exposed outer edge of the composite thermal management sheet can comprise a material 88 that pulls heat away from the body of the composite thermal management sheet. Exemplary materials to apply to an exposed edge of the composite thermal management sheet include ceramics such as boron nitride or aluminum nitride, a metal such as aluminum, a high heat capacity wax, a phase change material, or the like, or a combination thereof.

The cell assemblies are used in batteries. A battery includes a housing that at least partially encloses one or more electrochemical cells or cell arrays. The housing can be of any type, for example a polymer or a pouch of a pouch cell. The composite thermal management sheet can be disposed on, or disposed directly on a cell or cell array in any configuration in the battery. The composite thermal management sheet can be placed between individual cells or cell arrays in the battery. The composite thermal management sheet can be placed on, e.g., at the top, in between, below, adjacent, or a combination thereof the sides of the cells or cell arrays in the battery, a portion thereof, or a selected set of cells or cell arrays in the battery. The composite thermal management sheet can be placed or adhered to a plurality of pouch cells, pressure management pads, cooling plates, or other interior battery components. The assembly pressure of the battery can hold stacked components into place.

Figure 5:
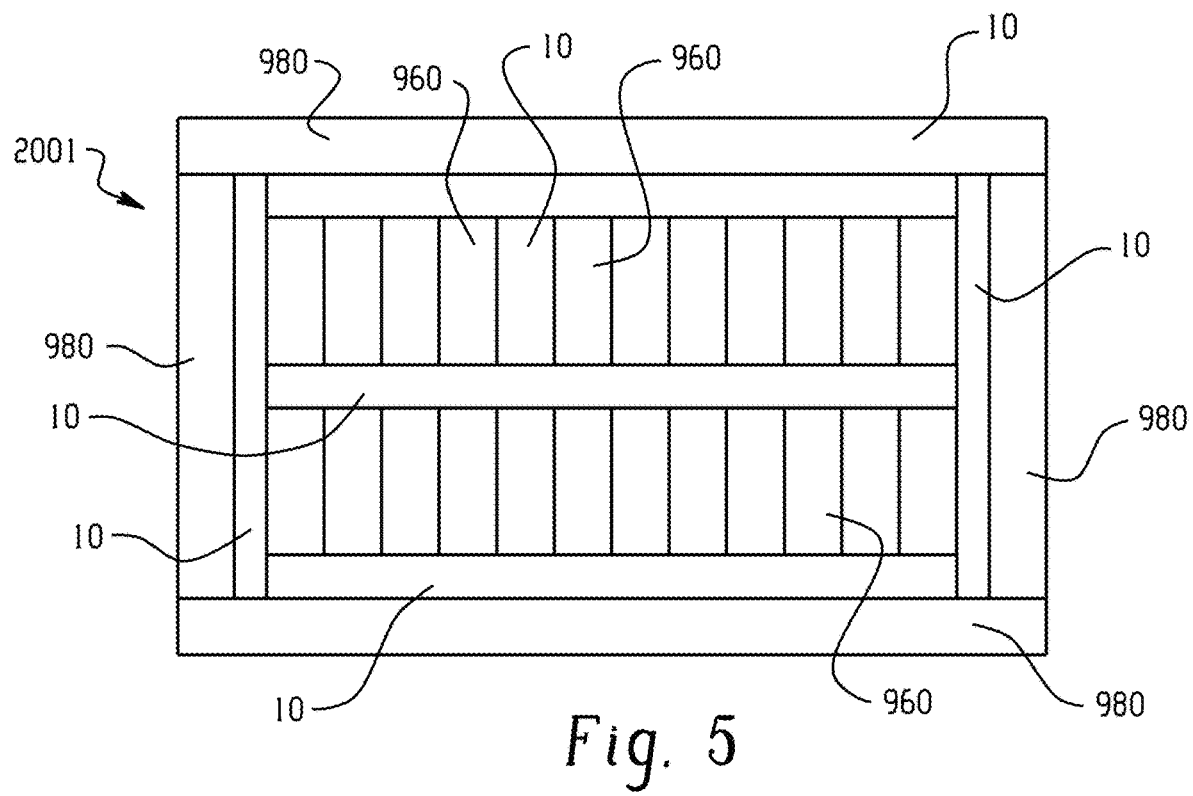
FIG. 5 is a schematic drawing of an aspect of an assembly for a battery including the composite thermal management sheet.
Figure 12:
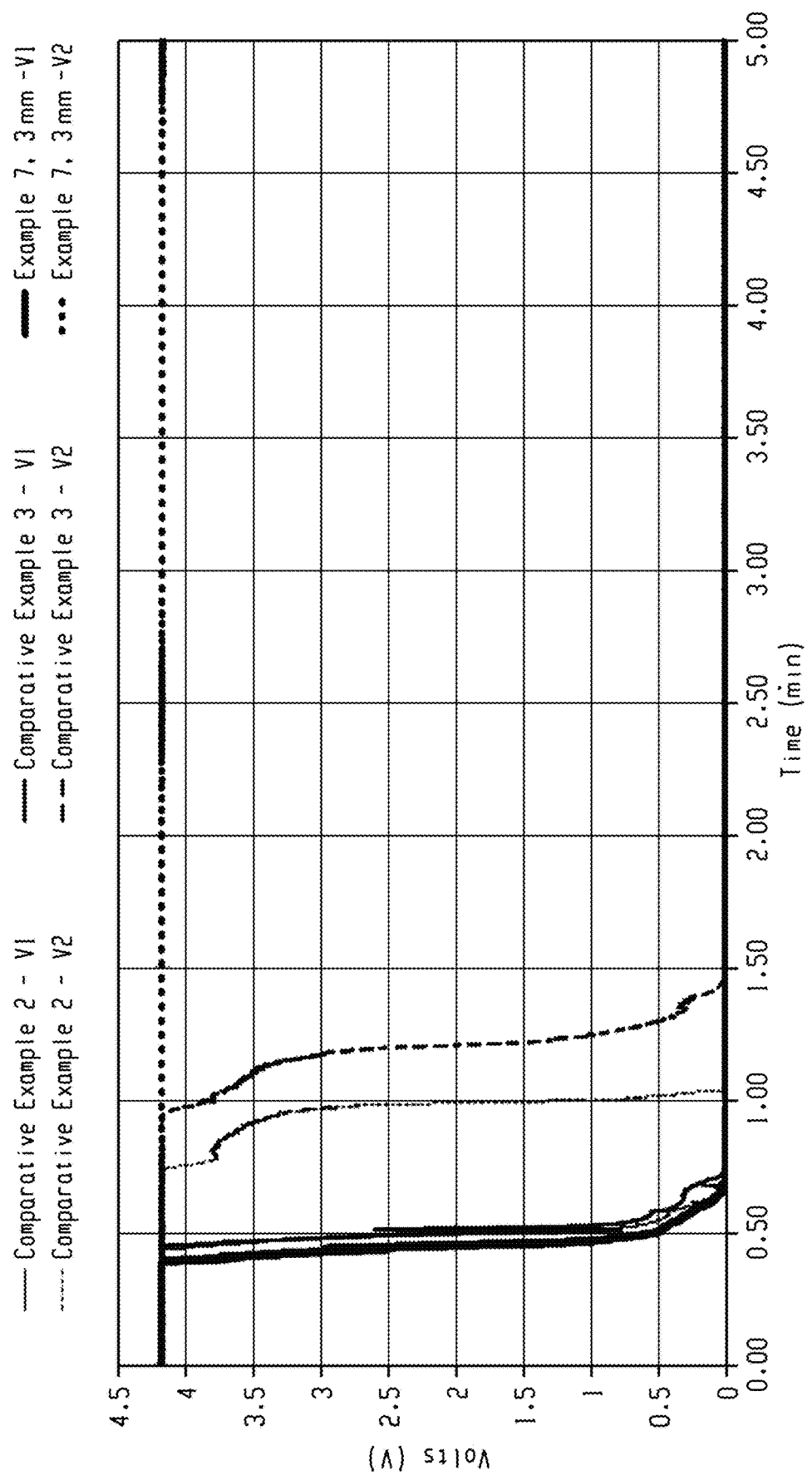
FIG. 12 is a graph of volts (V) versus time (min) showing results of nail penetration testing of Comparative Examples 2 and 3 and Example 7 at different thicknesses.

For example, as shown in FIG. 5, a battery 2001 can contain a plurality of cells in a plurality of cell arrays 700 inside a housing 800. The composite thermal management sheet 10 can be disposed between two cell arrays 700. Further as shown in FIG. 12, the composite thermal management sheet 10 can be disposed between a side of housing 800 and a side of a cell array 700, along a plurality of the cells of the cell array. Also as shown in FIG. 12, the thermally insulating composite thermal management sheet 10 can be disposed between an end of housing 800 and an end of one or more cell arrays 700.

If more than one composite thermal management sheet or other layer is used, the sheets and layers can be assembled by methods known in the art. The sheets and layers can be assembled on a surface of a cell or other component of a battery (for example, a wall of a battery case). In an aspect, the sheets and layers are assembled separately, and then placed or adhered to the cell, the battery component, or both. Each of the sheets or layers can be manufactured separately, and then stacked (placed or adhered using, for example, one or more adhesive layers) in the desired order. Alternatively, one or more individual layers can be manufactured on another individual layer, for example by coating, casting, or laminating using heat and pressure. For example, in an aspect, a flame retardant layer or an adhesive layer can be directly cast onto the composite thermal management sheet. Direct coating or casting can decrease thickness and improve flame retardance by eliminating an adhesive layer.

The following examples are provided to illustrate the present disclosure. The examples are merely illustrative and are not intended to limit devices made in accordance with the disclosure to the materials, conditions, or process parameters set forth therein.

EXAMPLES

The materials listed in Table 1 were used in the examples.

TABLE 1

| Component | Description | Tradename | Manufacturer |
|---|---|---|---|
| Vinyl-PDMS | Vinyl-terminated polydimethylsiloxane; 100000 mm$^2$/s viscosity at 25° C.; 0.973 specific gravity at 25° C.; >300° C. flashpoint (closed cup); −45° C. freezing point; 21.1 mN/m surface tension; 1.33 Pascal vapor pressure at 200° C. | FLD V1000 | Elkem Silicones |
| Silicone hydride | Silicone hydride; 25 mm$^2$/s at 25° C. viscosity; specific gravity at 25° C. 1.0; active ingredients (%) 100; flashpoint (closed cup): 110° C.; diluents: aliphatic or aromatic hydrocarbons; esters, ketones, SiH Content: 44.5% | WR-68 | Elkem Silicones |
| Catalyst | Karstead's platinum catalyst, 1,3-divinyl-1,1,3,3-tetramethyl-disiloxane platinum(0) in polysiloxane. 10% Pt$^0$ | PT56710C | Umicore Precious Metals Chemistry, LLC |
| Inhibitor | MVT Inhibitor; methyl-vinyl cyclic inhibitor ((Me-4-Vi-CYC) | FLD 50842 | Elkem Silicones |
| ATH | Aluminum trihydrate; 1-5 micrometers (μm) particle size | Micral 855 | J.M. Huber Corporation |
| Borax1 | Sodium tetraborate pentahydrate; CAS # [12179-04-3] Na$_2$B$_4$O$_7$•5H$_2$O | Borax | MiniScience Inc. |
| Borax2 | Sodium borate; also known as Borax Pentahydrate | ETiBOR-48 | ETİMİNE USA INC. |

TABLE 1-continued

| Component | Description | Tradename | Manufacturer |
|---|---|---|---|
| | or "5 Mol Borax" | | |
| SAP | Superabsorbent polymer, sodium poly(acrylate); mean particle size distribution: 0-45 μm; absorption capacity (g/g deionized water): >320; Moisture (%): <10 | X-S025R | Zappa Stewart |
| Sodium silicate | Hydrous,Na$_2$SO* H$_2$O, wt. ratio SiO$_2$/Na$_2$O: 3.22, 19.2% Na$_2$O, 61.8% SiO$_2$, 18.5% H$_2$O; density 0.70 g/cm$^3$; characteristics: fine white powder; CAS# 1344-09-8 | Sodium silicate, low alkaline | MiniScience Inc. |
| Zinc borate | 2ZnO*3B$_2$O$_3$*3. 5H$_2$O (zinc borate hydrate (2335), dodecaboron, tetrazinc docosaoxide, heptahydrate) moisture (%): <1.2, S.G: 2.77, Solubility (water): <0.28% at 25° C., MW: 434.7 g/mol, thermal stability: stable up to 290° C., pH at 20° C.: 6.8-7.5 (aqueous solution); particle size: 7 μm, refractive index: 1.58; water of crystallization, H$_2$O: 14.50%, boric oxide: 48.05%, zinc oxide: 37.45%, anhydrous equivalent: 85.50%, CAS: 138265-88-0 | Firebrake ZB | U.S. Borax Inc. |

Sample Preparation

Samples for Examples 1 to 6 were made by preparing a two-part formulation having a part A as shown in Table 2 and a part B, using benzyl alcohol as the blowing agent. The fillers were included in Part A. Part A and part B were then mixed, and cast between two release layers. The amount cast was adjusted to achieve the desired thickness after foaming and curing the cast mixture. Foaming and cure were carried out at 70° C., for 10 minutes. The composite thermal management sheets of Examples 1 to 6 were cured for 12 hours at 94° C. and cut to proper size. The composite thermal management sheets were then tested as described below.

Thermal Testing

Figure 6:
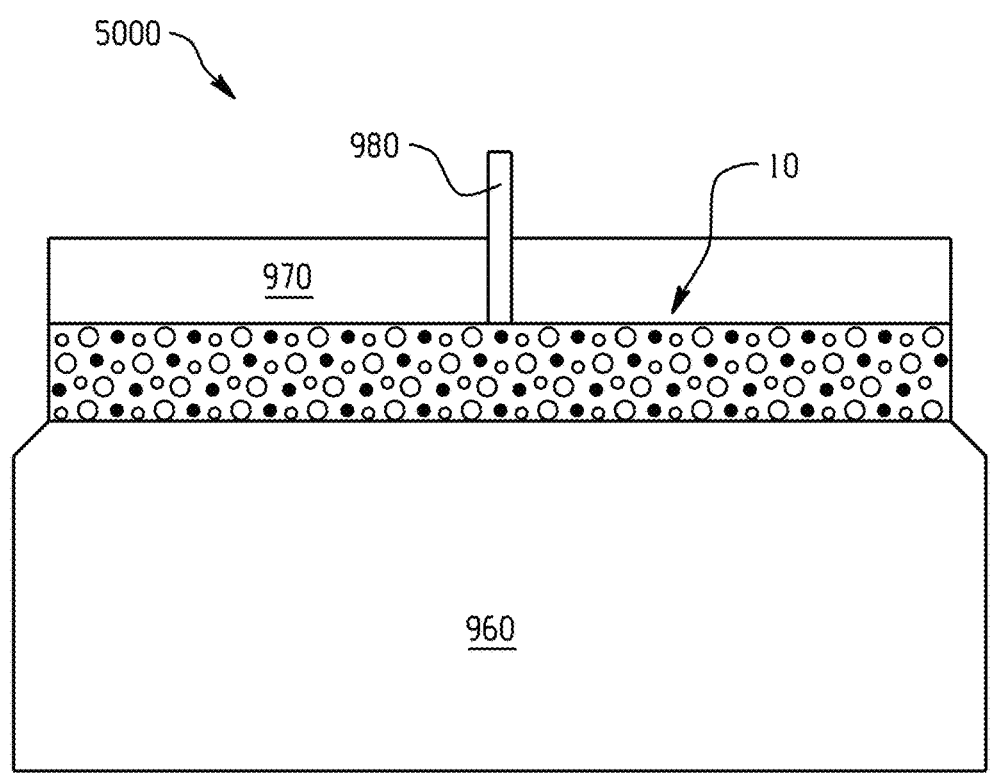
FIG. 6 is a schematic of an apparatus for a hot plate test.

Thermal performance of each sample was determined in a thermal runaway simulation. FIG. 6 illustrates the apparatus 5000 used for the thermal testing. A composite thermal management sheet 10 was disposed directly on hot plate 960 set to 550° C. The pyrogel surface of Comparative Example 1 was placed on the hotplate. A 12.7 mm mica plate cell analog 970 was placed on the top surface of the composite thermal management sheet 10. A thermocouple sensor 980 was inserted into a hole drilled in the mica plate cell analog 970 to dispose the thermocouple sensor 980 on the top surface of the composite thermal management sheet 10.

Comparative Example 1

A comparative example including an unfilled, polyurethane foam layer and a pyrogel thermal barrier layer was tested. The two layers were adhered using a multipurpose silicone adhesive.

Examples 1 to 6

Examples 1 to 6 were prepared using the components shown in Table 2. The amounts are shown as parts by weight of each side, where the vinyl-terminate silicone and the reactive filler composition total 100 parts by weight. Part B contained only silicone hydride. Part A and Part B were mixed in a weight ratio of A:B=20:1 (20 parts of Part A to 1 part of Part B).

Table 2 also shows the thickness of each cured sample before testing, whether a thermal barrier layer was formed in situ, and whether deformation of the thermal barrier layer occurred upon testing.

TABLE 2

| Component | Ex. 1 | Ex. 2 | Ex. 3 | Ex. 4 | Ex. 5 | Ex. 6 |
|---|---|---|---|---|---|---|
| Part A | | | | | | |
| Vinyl-PDMS | 50 | 50 | 50 | 50 | 50 | 50 |
| Catalyst | 0.0085 | 0.0085 | 0.0085 | 0.0085 | 0.0085 | 0.0085 |
| Inhibitor | 0.0795 | 0.0795 | 0.0795 | 0.0595 | 0.098 | 0.098 |
| Benzyl alcohol | 0.31 | 0.31 | 0.31 | 0.15 | 0.31 | 0.31 |
| Borax1 | 25 | 25 | | | 30 | |
| Zinc borate | 25 | 25 | 30 | | | 20 |
| ATH | | | 20 | 30 | | 10 |
| SAP | | | | 20 | | |
| Sodium silicate | | | | | 20 | 20 |
| Properties | | | | | | |
| Thickness, mm | 5 | 1 | 3.2 | 3.2 | 2.79 | 2.5 |
| Barrier layer | Yes | Yes | Yes | Yes | Yes | Yes |
| Deformation | Yes | Yes | No | No | No | No |

Figure 7:
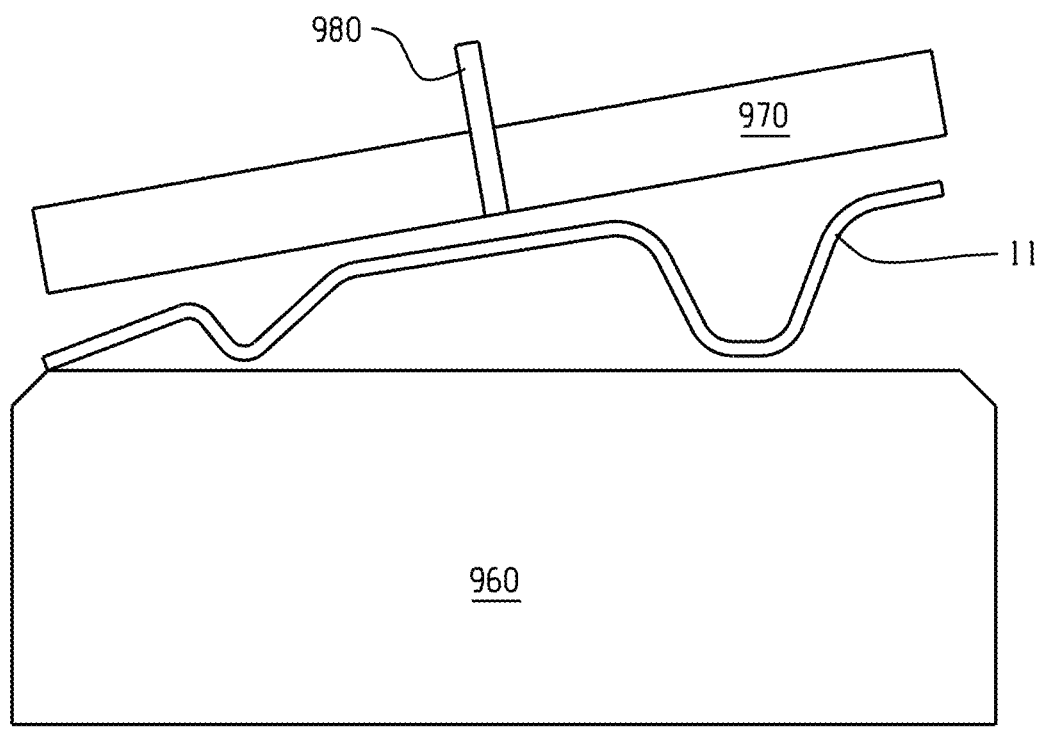
FIG. 7 is an illustration of deformed barrier layer located between the hot plate and the top layer of the apparatus for a hot plate test.

As shown in FIG. 7, a reactive filler containing a combination of borax and zinc borate (Examples 1 and 2) provided a thermal barrier layer 11 having deformed (curved) surfaces. The curved surfaces are formed despite the cell analog 970 on the testing apparatus exerting a downward force on the sheet. This force is similar to a force that could be exerted by a battery pad. Since deformation of the sheet occurs even with the downward force exerted by the cell analog 970, and the thermal barrier layer formed lifts the cell analog 970, the thermal barrier layer would effectively push back on an expanding cell, as well as delay convective heat transfer by creating air pockets. It also lessens the surface area of the contact point, and thus would also delay conductive heat transfer.

Figure 8:
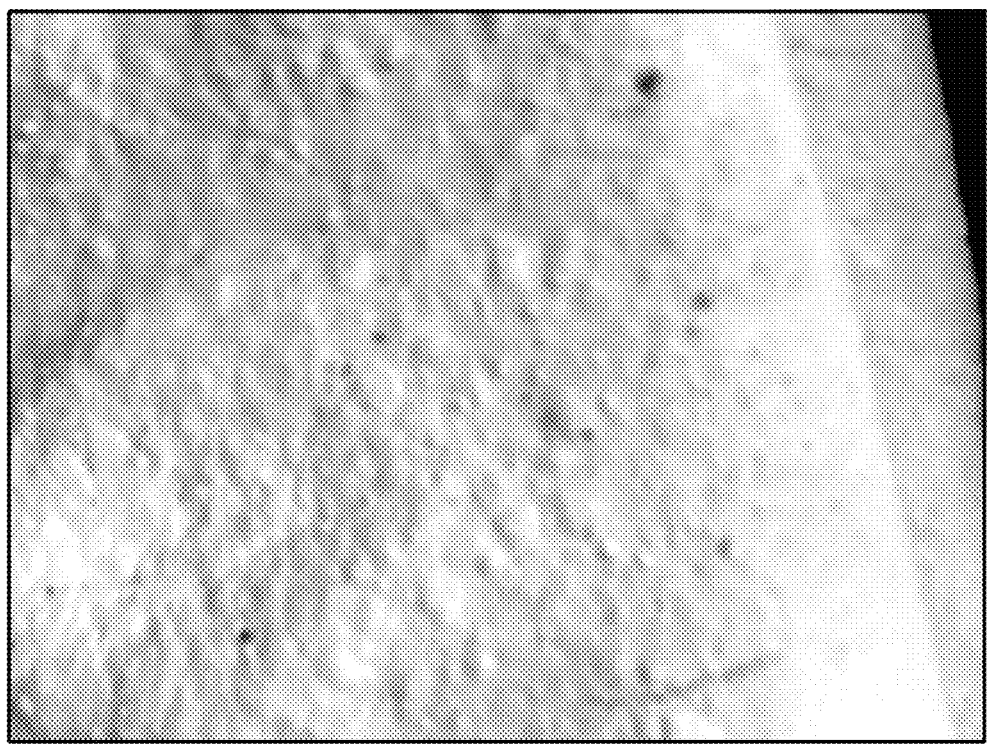
FIG. 8 is photograph of a borosilicate thermal barrier layer formed from a reactive filler composition including borax and zinc borate.

FIG. 8 shows another view of a thermal barrier layer formed from a reactive filler composition including borax and zinc borate of Examples 1 and 2. The thermal barrier layer is continuous and flexible. This is in distinct contrast to barrier layers formed by prior art compositions, which can be discontinuous and nonelastic (friable), for example similar to charcoal.

Figure 9:
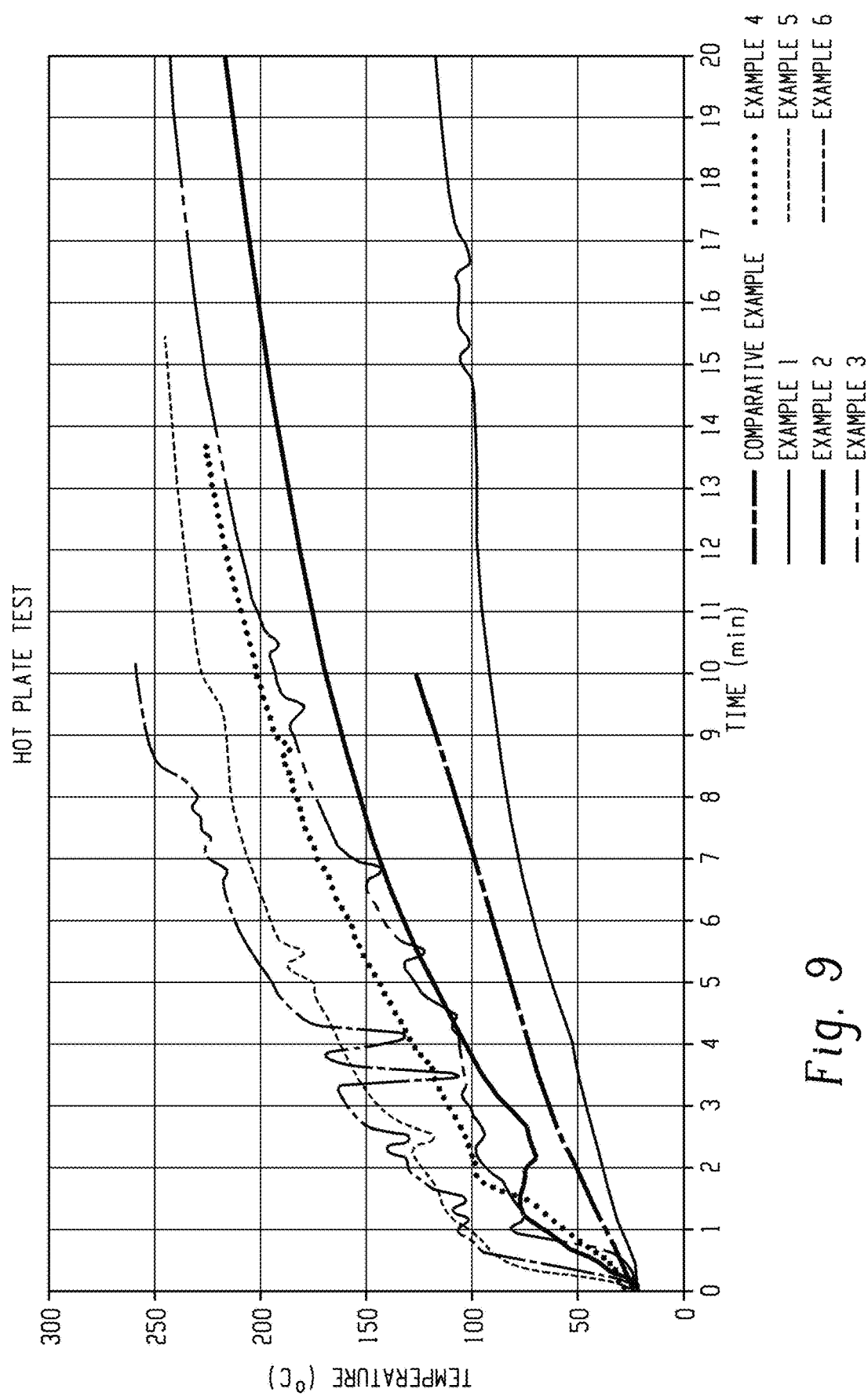
FIG. 9 is a graph of temperature (° C.) versus time (minutes (min)) showing results of simulated thermal runaway testing of Comparative Example 1 and Examples 1 to 6.

FIG. 9 shows the temperature increase detected by the thermocouple for each sample measured over time. Advantageously, all samples demonstrated thermal barrier properties. The reactive filler composition containing a combination of borax and zinc borate (Examples 1 and 2) provided better thermal performance than Examples 3 to 6.

Examples 1 and 2 had the same composition, but the thicker sheet of Example 1 provided better thermal protection to the opposing surface than the thinner sheet of Example 2. After 10 minutes, the measured temperature for Example 1 was lower than that for Comparative Example 1 and Examples 2 to 6. For electric vehicle battery applications, technical feasibility can be determined by the time to reach 150° C., which is desirably as long as possible, for example at least 10 minutes. Even over a prolonged exposure of 20 minutes, the opposing surface of the composite thermal management sheet of Example 1 was only 140° C., and did not reach 150° C.

Without being bound by theory, it is believed that the excellent results produced by Example 1 are due to different mechanisms working in concert. First, it is believed that heat is absorbed due to the heat capacity of the borax and zinc borate. Heat is further absorbed by the release of water from the borax. The production of water vapor can provide increased heat convection through the flexible porous layer away from the heat source. However, increased exposure to the heat source results in formation of a thermal barrier layer that blocks the heat convection by water vapor and hot gasses, thereby providing improved thermal resistance at higher temperatures. The formation of the thermal barrier layer can further decrease or prevent heat conduction. In the case of Examples 1 and 2 which show that a deformed barrier is formed, heat conduction can be additionally decreased.

Nail Penetration Testing

Figure 10A:
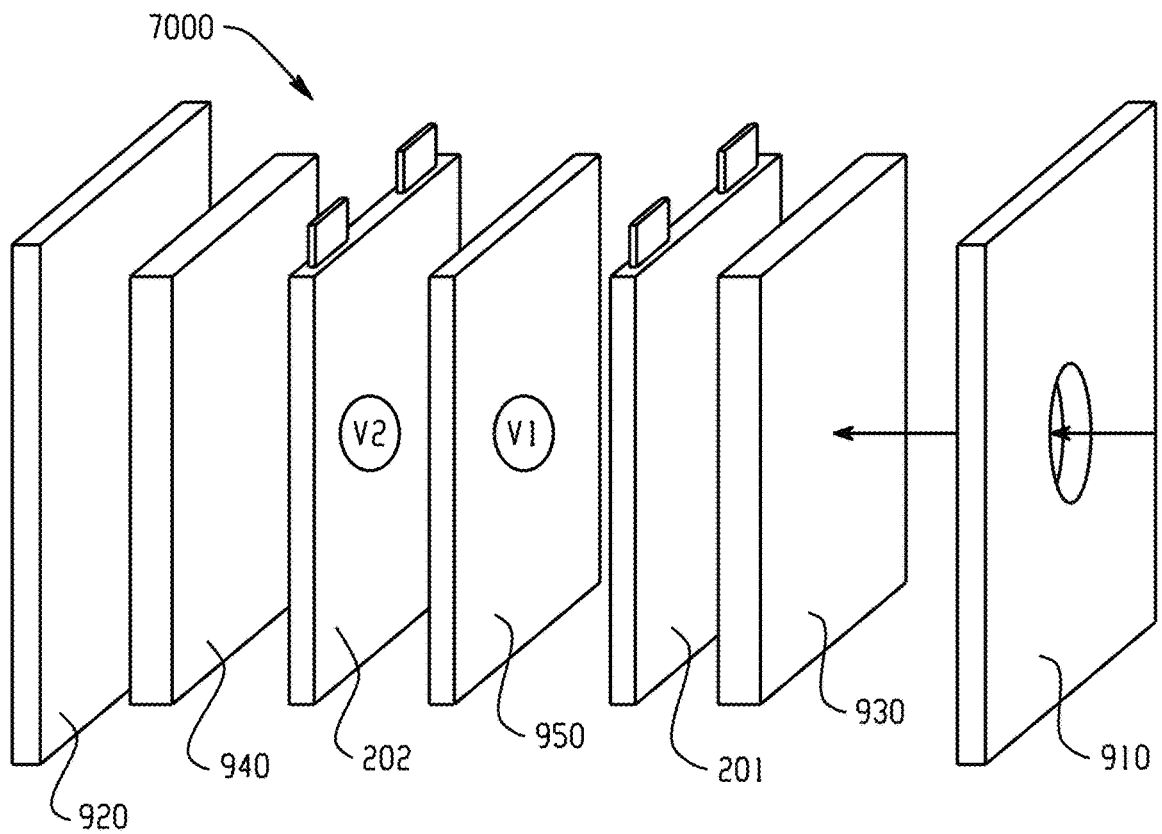
FIG. 10A is an exploded view of schematic of a first apparatus for nail penetration testing.
Figure 10B:
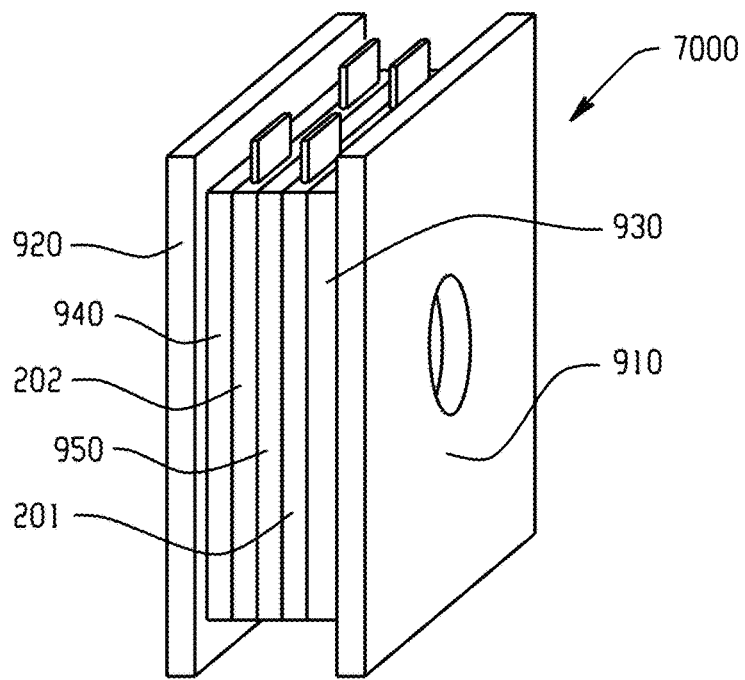
FIG. 10B is a non-exploded view of the schematic shown in FIG. 10A.

Nail penetration testing was performed. FIG. 10A and FIG. 10B are exploded and non-exploded views, respectively, of a schematic of a first apparatus 7000 for the nail penetration testing, including aluminum end plates 910, 920 (having dimensions of 185 mm×90 mm×15.2 mm), polytetrafluoroethylene insulation film 930, 940 (having dimensions of 185 mm×90 mm×1 mm), pouch cells 201, 202, and the sample 950 tested (for example, the composite thermal management sheet). Characteristics of the cells 201, 202 are provided in Table 3. Cell 201 was punctured by an 8 mm nail inserted at an indentation rate of 10 mm/s to initiate runaway. The cells 201, 202 were electrically isolated. Multiple thermocouples measured the temperature profile. Location V1 was between nailed (e.g., failing) cell 201 and the sample 950 tested and location V2 was between the sample 950 tested and neighboring cell 202. Voltage was also measured.

TABLE 3

| Cell information | Hi Power Polymer Li-Ion (nickel manganese cobalt (NMC) Pouch) |
|---|---|
| Capacity | 80 ampere-hour (Ah) |
| | 296 Watt-hour (Wh) |
| Voltage | 3.7 volts (V) (standard); 4.2 V (charging) |
| Energy Density | 250.8 Wh/kilogram (kg) |

TABLE 3-continued

| Cell information | Hi Power Polymer Li-Ion (nickel manganese cobalt (NMC) Pouch) |
|---|---|
| Dimensions (L × W × H) | 337 mm × 146 mm × 12 mm |
| Weight | 1.18 kg |

Comparative Example 2

A comparative example including no foam layer was tested.

Comparative Example 3

A comparative example including an unfilled, polyurethane foam layer was tested.

Examples 7 and 8

Examples 7 and 8 were prepared using the components shown in Table 4. Part A and Part B were mixed in a weight ratio of A:B=20:1 (20 parts of Part A to 1 part of Part B).

TABLE 4

| Component | Example 7 | Example 8 |
|---|---|---|
| Part A | | |
| Vinyl-PDMS | 0.498 pounds (lbs) (225.9 g) | 0.498 lbs (225.9 g) |
| Catalyst | 0.0384 g | 0.0384 g |
| Inhibitor | 0.3592 g | 0.3592 g |
| Benzyl alcohol | 0.003 lbs (1.4 g) | 0.003 lbs (1.4 g) |
| Zinc borate | 0.299 lbs (135.5 g) | 0.249 lbs (112.9 g) |
| ATH | 0.199 lbs (90.4 g) | |
| Borax2 | | 0.249 lbs (112.9 g) |
| Part B | | |
| Silicone hydride | 0.4 lbs (181.4 g) | 0.4 lbs (181.4 g) |
| Vinyl-PDMS | 0.6 lbs (272.2 g) | 0.6 lbs (272.2 g) |

Figure 11:
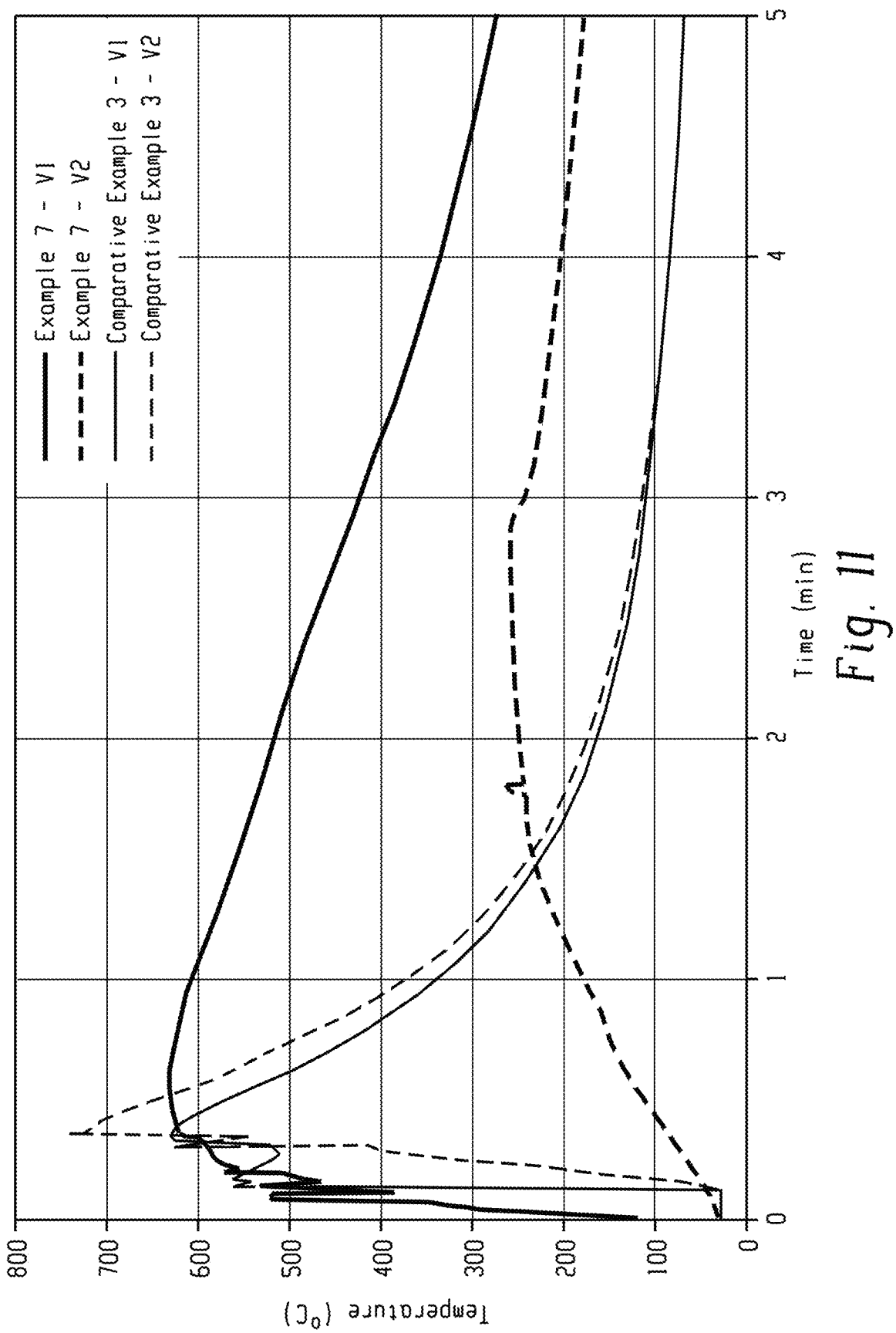
FIG. 11 is a graph of temperature (° C.) versus time (min) showing results of nail penetration testing of Comparative Example 3 and Example 7.

Results of the nail penetration testing of Comparative Example 2 and Example 7 are provided in Tables 5 and 6, FIG. 11, and FIG. 12. FIG. 11 is a graph of temperature (° C.) versus time (min) showing results of the nail penetration testing of Comparative Example 3 and Example 7. As shown in FIG. 11, Example 7 was able to stop thermal runaway in the test. FIG. 12 is a graph of volts (V) versus time (min) showing results of the nail penetration testing of Comparative Examples 2 and 3 and Example 7 at different thicknesses. Results from FIG. 12 include an 18 second delay for Comparative Example 12, a 31 second delay for Comparative Example 2, a 102 second delay for Example 7 at 2 mm thickness, and no runaway for Example 7 at 3 mm thickness.

TABLE 5

| Sample | Thickness (mm) | Maximum Temperature (° C.) | Delay based on voltage (seconds) | Thermal Runaway Result in Video |
|---|---|---|---|---|
| Comparative Example 2 | — | Nailed cell: 1024.1 Neighbor cell: 1014 | 18 | Nailed Cell: 11:31:56 got fire Neighbor Cell: 11:32:14 got fire |

TABLE 5-continued

| Sample | Thickness (mm) | Maximum Temperature (° C.) | Delay based on voltage (seconds) | Thermal Runaway Result in Video |
|---|---|---|---|---|
| Example 7 | 3.126 | Nailed cell: 708.8 Neighbor cell: 737.9 | infinite | No foam neighbor cell caught fire after 18 seconds Nailed Cell: 15:23:08 got fire Neighbor Cell: No Fire |

TABLE 6

| | Mass Decrease (%) | Short Circuit Delay (seconds) |
|---|---|---|
| Example 7 | 10.3 | Infinite |
| Comparative Example 3 | 91.4 | 21 |

UL94 500 W (125 mm) Vertical Burn Testing

Twenty (20) of each material type were conditioned at 70±2° C. for 168±2 hours according to UL94 section 6.2 conditioning. All samples were arranged and tested per UL 94 section 9.5. Table 7 provides vertical burning material classification requirements and Table 8 provides testing results.

TABLE 7

| Criteria | 94.5VA | 94.5VB |
|---|---|---|
| Afterflame time plus afterflow time after fifth flame application for each individual bar specimen | ≤60 s | ≤60 s |
| Cotton indicator ignited by flaming particles or drops from any bar specimen | No | No |
| Burn-through (hole) of any plaque specimen | No | Yes |

TABLE 8

| Sample Number | After flame and Afterglow Time (seconds) | Ignition of Cotton Indicator? | Burn Through |
|---|---|---|---|
| Example 7 1.5 mm | | | |
| 1 | 5 | N | N |
| 2 | 9 | N | N |
| 3 | 18 | N | N |
| 4 | 52 | N | N |
| 5 | 14 | N | N |
| Result | | | 94-5VA |
| Example 7 3 mm | | | |
| 1 | DNI† | N | N |
| 2 | DNI | N | N |
| 3 | DNI | N | N |
| 4 | DNI | N | N |
| 5 | DNI | N | N |
| Result | | | 94-5VA |
| Example 8 1.5 mm Set 1 | | | |
| 1 | 95 | N | N |
| 2 | 114 | N | N |
| 3 | 101 | N | N |
| 4 | 97 | N | N |
| 5 | 104 | N | N |
| Result | | | Fail |
| Example 8 | 1 | 88 | N | N |

TABLE 8-continued

| Sample Number | After flame and Afterglow Time (seconds) | Ignition of Cotton Indicator? | Burn Through |
|---|---|---|---|
| 1.5 mm Set 2 | | | |
| 2 | 75 | N | N |
| 3 | 49 | N | N |
| 4 | 112 | N | N |
| 5 | 53 | N | N |
| Result | | | Fail |
| Example 8 3 mm Set 1 | | | |
| 1 | 189 | N | N |
| 2 | 94 | N | N |
| 3 | DNI | N | N |
| 4 | 15 | N | N |
| 5 | 47 | N | N |
| Result | | | Fail |
| Example 8 3 mm Set 2 | | | |
| 1 | DNI | N | N |
| 2 | 5 | N | N |
| 3 | DNI | N | N |
| 4 | 52 | N | N |
| 5 | DNI | N | N |
| Result | | | 95-5VA |

†Did not ignite

Figure 13:
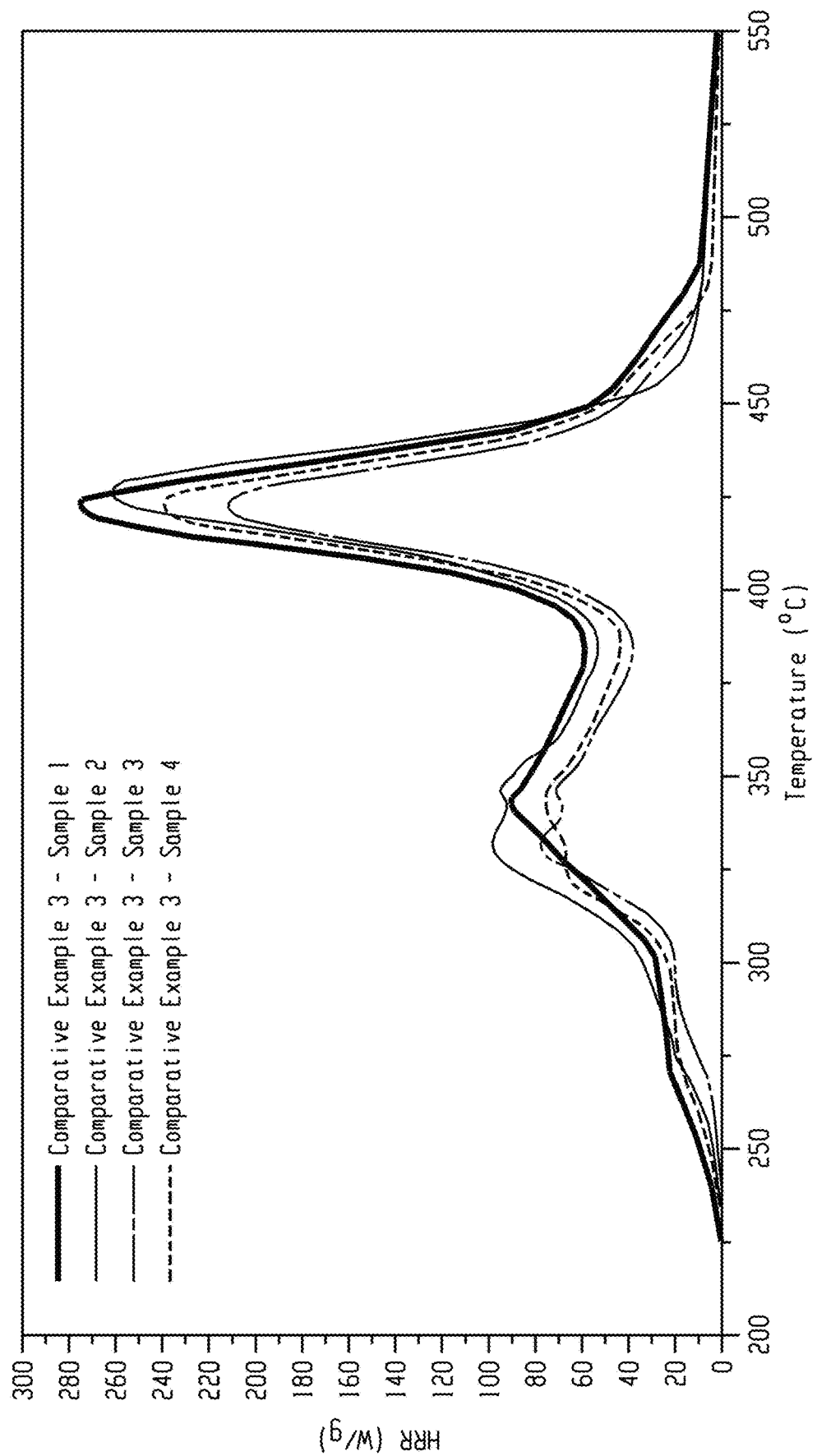
FIG. 13 is a graph of heat release rate (HRR) (watts per gram (W/g)) versus temperature (° C.) for Comparative Example 3.
Figure 14:
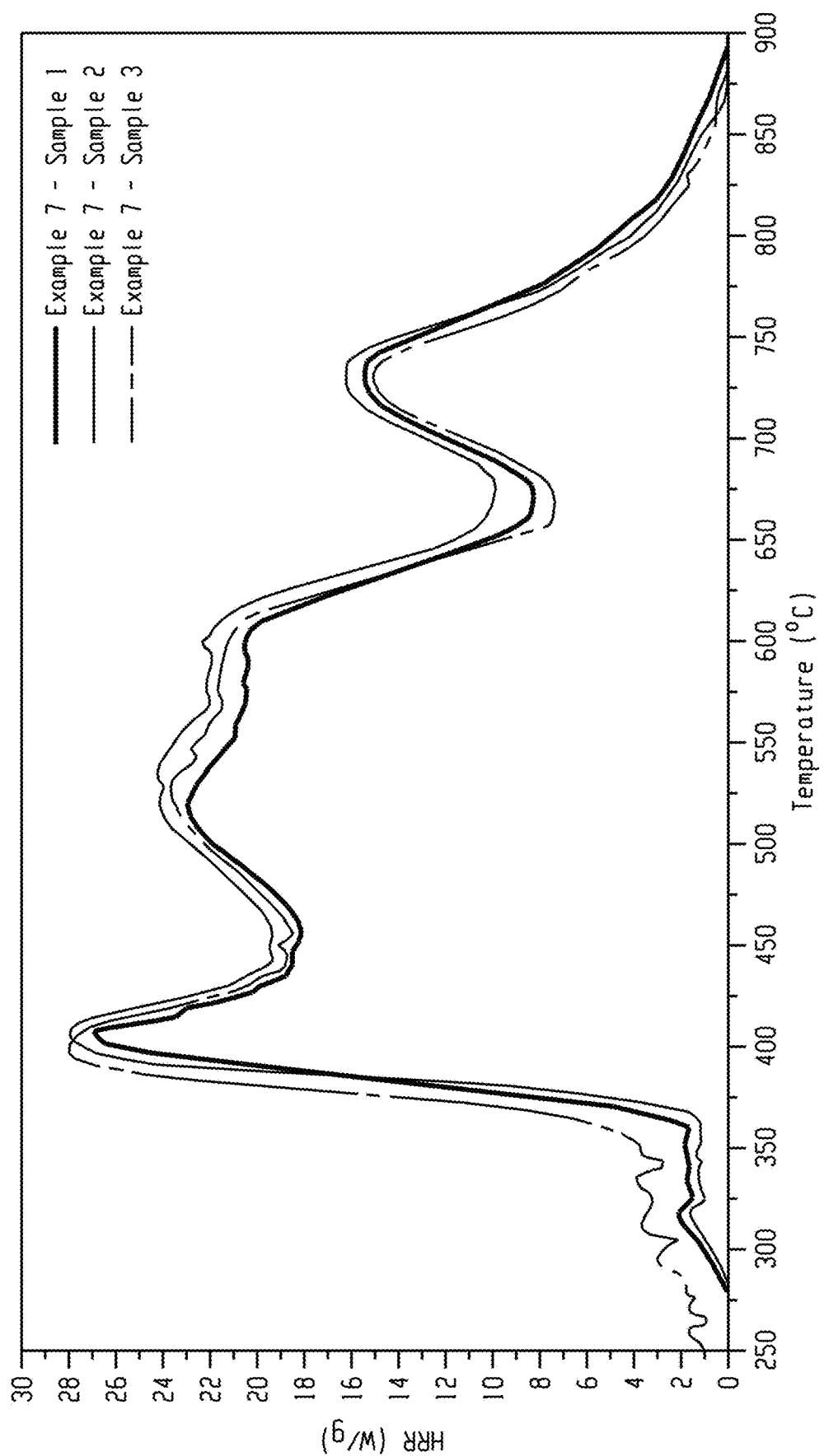
FIG. 14 is a graph of HRR (W/g) versus temperature (° C.) for Example 7.
Figure 15:
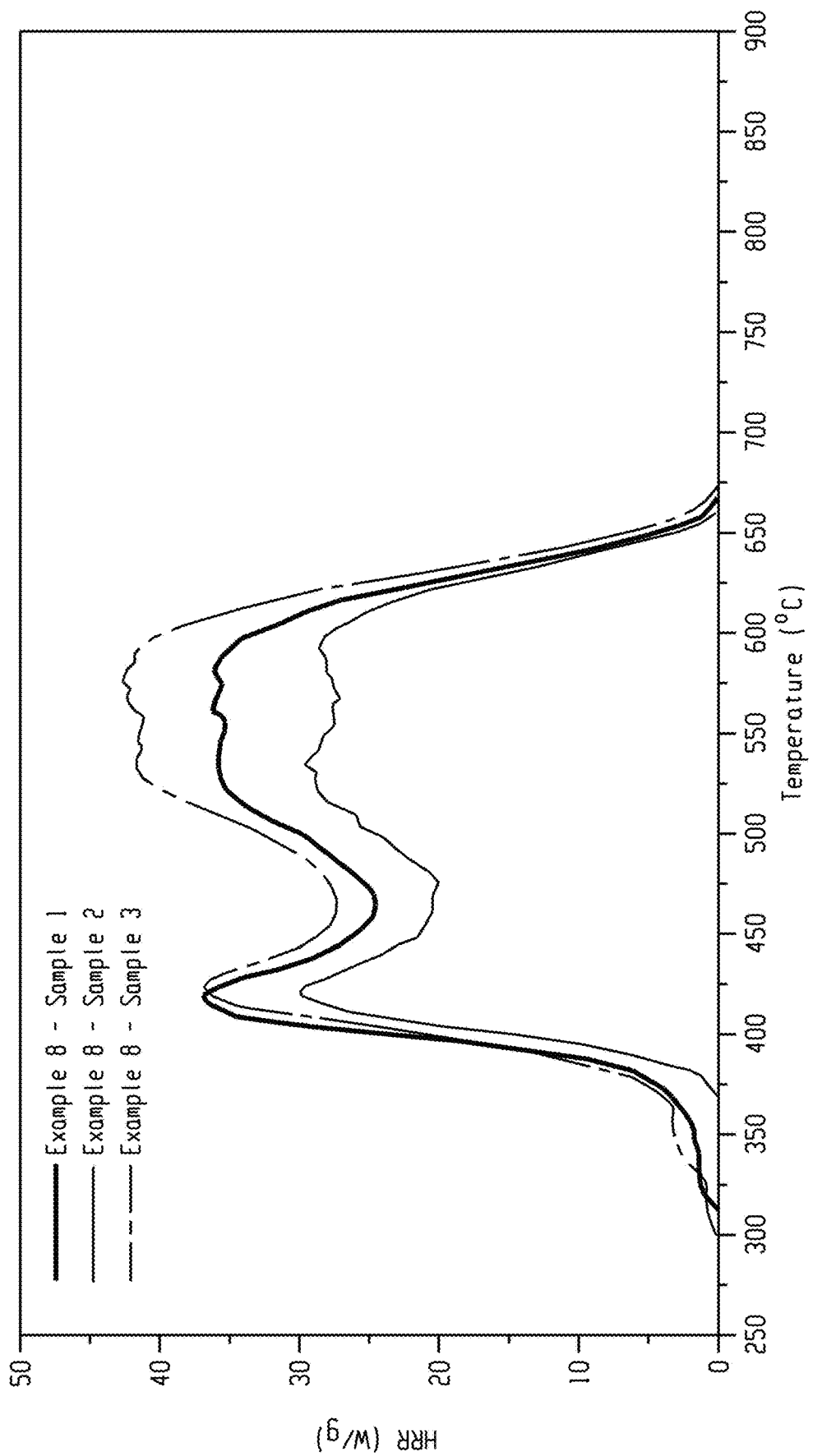
FIG. 15 is a graph of HRR (W/g) versus temperature (° C.) for Example 8.

Microcalorimetry results for Comparative Example 3 are provided in FIG. 13 and Table 9, microcalorimetry results for Example 7 are provided in FIG. 14 and Table 10, and microcalorimetry results for Example 8 are provided in FIG. 15 and Table 11. FIG. 13, FIG. 14, and FIG. 15 have different X and Y axis scales.

TABLE 9

| Comparative Example 3 | Heat Release Capacity (HRC) (joules per gram kelvin (J/g-K)) | Peak heat release rate (HRR) (watts per gram (W/g)) | Total heat release (HR) (kilojoules per gram (kJ/g)) |
|---|---|---|---|
| Sample 1 | 338 | 275 | 17.5 |
| Sample 2 | 330 | 263 | 17.1 |
| Sample 3 | 303 | 213 | 13.2 |
| Sample 4 | 305 | 239 | 14.8 |
| Average | 319 ± 15 | 248 ± 24 | 15.7 ± 1.8 |

TABLE 10

| Example 7 | HRC (J/g-K) | Peak HRR (W/g) | Total HR (kJ/g) |
|---|---|---|---|
| Sample 1 | 63.7 | 27.4 | 7.3 |
| Sample 2 | 66.5 | 28.2 | 7.7 |
| Sample 3 | 66.1 | 28.4 | 7.8 |
| Average | 65.4 ± 1.4 | 28.0 ± 0.4 | 7.6 ± 0.2 |

TABLE 11

| Example 8 | HRC (J/g-K) | Peak HRR (W/g) | Total HR (kJ/g) |
|---|---|---|---|
| Sample 1 | 83.4 | 36.9 | 7.8 |
| Sample 2 | 75.2 | 30.1 | 6.2 |
| Sample 3 | 90.6 | 42.6 | 8.8 |
| Average | 83.1 ± 6.3 | 36.5 ± 5 | 7.6 ± 1 |

FIG. 16A and FIG. 16B are exploded and non-exploded views, respectively, of a schematic of a second apparatus 8000 for the nail penetration testing, including aluminum end plates 911, 921, polytetrafluoroethylene insulation film 931, 941, 12 Ah pouch cells 203, 204, 205 and the samples 951, 952 tested (for example, the composite thermal management sheet). Cell 204 was punctured by a nail to initiate runaway. The cells 203, 204, 205 were electrically isolated. Multiple thermocouples measured the temperature profile at locations V3, V4, V5, TC1, TC2, TC8 as shown in FIG. 16A.

Figure 17:
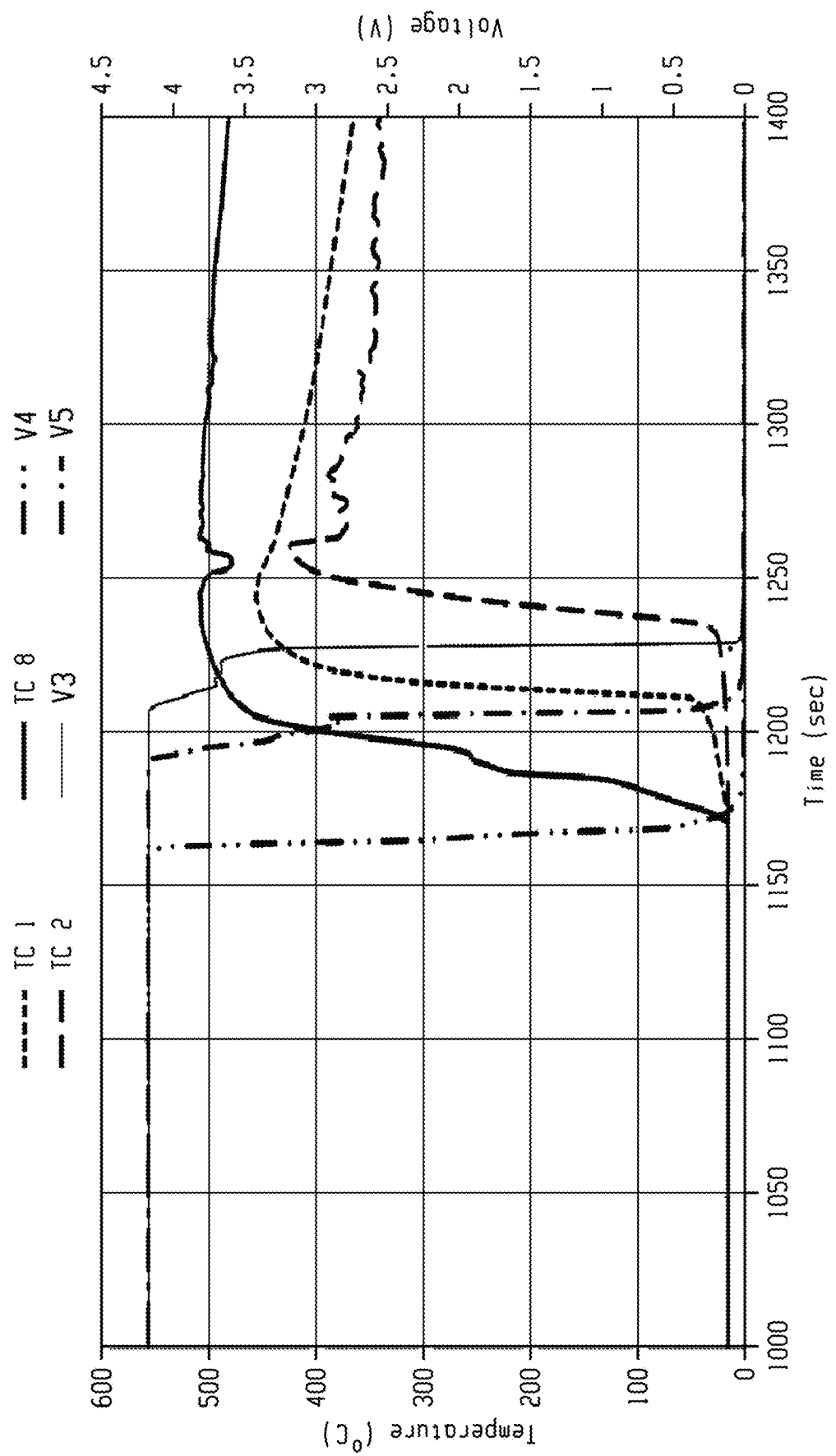
FIG. 17 is a graph of temperature (° C.) versus time (seconds (s)) showing results of nail penetration testing of Comparative Example 3.
Figure 18:
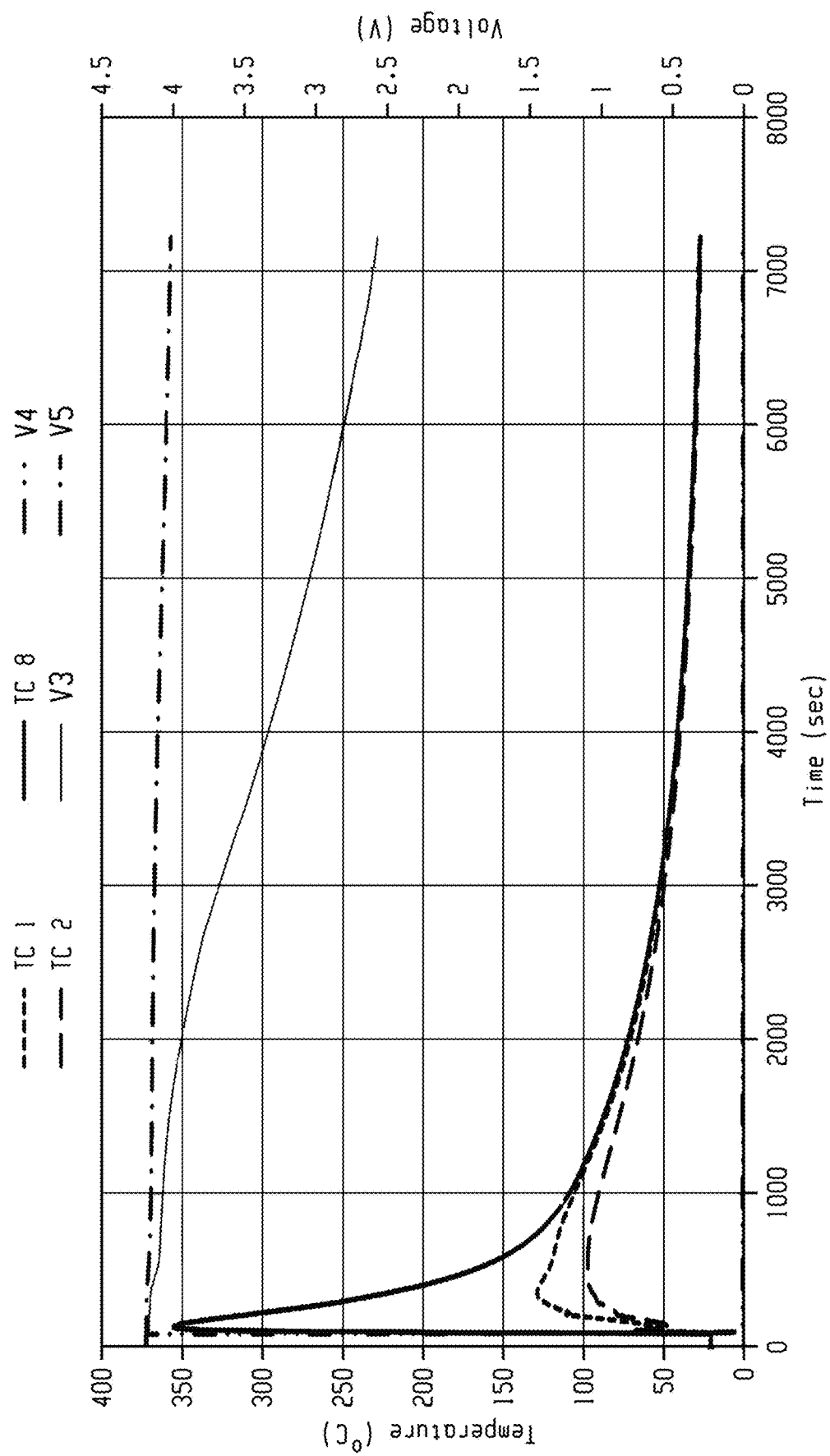
FIG. 18 is a graph of temperature (° C.) versus time (s) showing results of nail penetration testing of Example 7.
Figure 19:
FIG. 19 is photograph of Example 7 following a nail penetration test.
Figure 20:
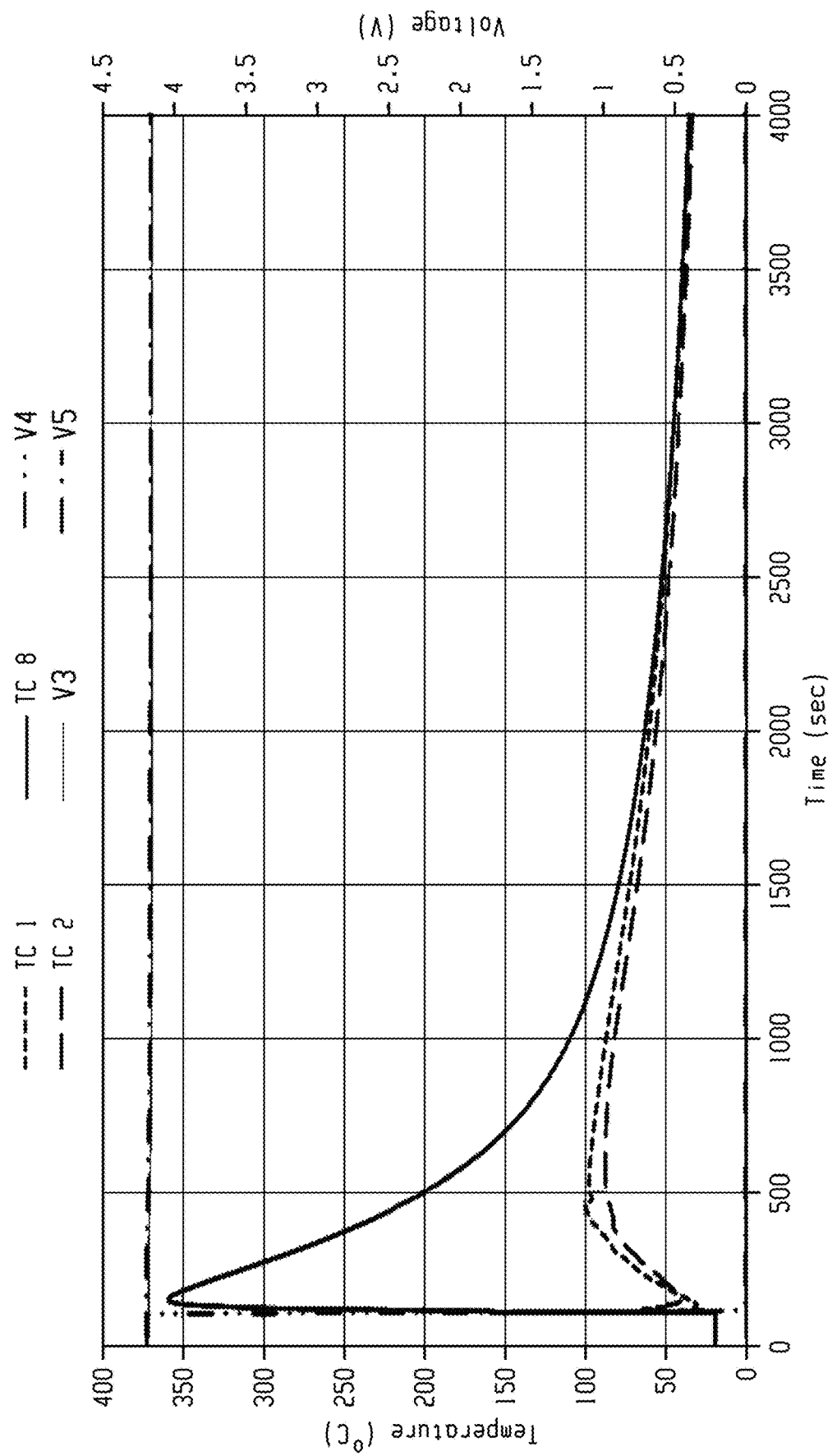
FIG. 20 is a graph of temperature (° C.) versus time (s) showing results of nail penetration testing of Example 8.

Results of the nail penetration testing of Comparative Example 3 are provided in Table 10 and FIG. 17, results of the nail penetration testing of Example 7 are provided in Table 11 and FIGS. 18 and 19, and results of the nail penetration testing of Example 8 are provided in Table 12 and FIG. 20. Each of FIG. 17, FIG. 18, and FIG. 20 is a graph of temperature (° C.) versus time (second (s)). FIG. 19 is photograph of Example 7 following nail penetration testing, which still desirably retains flexibility, as shown.

TABLE 10

| Comparative Example 3 | Initial mass (grams (g)) | Final mass (g) | Short circuit prevented? | Short circuit delay (s) |
|---|---|---|---|---|
| Sample 1 | 7.3 | 1-1.5 g (unable to accurately measure) | No | 58 |
| Sample 2 | 7.6 | 1-1.5 g (unable to accurately measure) | No | 52 |

TABLE 11

| Example 7 | Initial mass (g) | Final mass (g) | Short circuit prevented? | Short circuit delay (s) |
|---|---|---|---|---|
| Sample 1 | 34.8 | 30.2 | Yes | Infinite |
| Sample 2 | 34.4 | 29.9 | Yes | Infinite |

TABLE 12

| Example 8 | Initial mass (g) | Final mass (g) | Short circuit prevented? | Short circuit delay (s) |
|---|---|---|---|---|
| Sample 1 | 24.2 | 21.7 | Yes | Infinite |
| Sample 2 | 25.8 | 23.6 | Yes | Infinite |

Set forth below are non-limiting aspects of this disclosure.

Aspect 1: A composite thermal management sheet for a battery, the composite thermal management sheet comprising: a silicone foam layer; and a reactive filler composition disposed within the silicone foam layer, the reactive filler composition comprising a first filler that decomposes to generate water upon initial exposure to heat; and a second filler different from the first filler, wherein the second filler forms a thermal barrier layer with a decomposition product of the first filler, or absorbs the water, or both.

Aspect 2: The composite thermal management sheet of aspect 1, wherein the thermal barrier layer comprises a borosilicate glass layer, preferably a borosilicate glass layer having a curved surface.

Aspect 3: The composite thermal management sheet of aspect 2, wherein the borosilicate glass comprises silicon derived from decomposition of the silicone foam layer.

Aspect 4: The composite thermal management sheet of any one of the foregoing aspects, wherein the first filler and the second filler are at least two of aluminum trihydrate, ammonium nitrate, borax, hydrous sodium silicate, magnesium hydroxide, magnesium carbonate hydroxide pentahydrate, magnesium phosphate tribasic octahydrate, zinc borate, a superabsorbent polymer, or waterglass.

Aspect 5: The composite thermal management sheet of aspect 4, wherein the first filler comprises aluminum trihydrate, hydrous sodium silicate, magnesium carbonate hydroxide pentahydrate, magnesium phosphate tribasic octahydrate, a superabsorbent polymer, waterglass, or a combination thereof.

Aspect 6: The composite thermal management sheet of aspect 4 or 5, wherein the second filler comprises ammonium nitrate, borax, hydrous sodium silicate, magnesium hydroxide, magnesium carbonate hydroxide pentahydrate, magnesium phosphate tribasic octahydrate, zinc borate, a superabsorbent polymer, or a combination thereof.

Aspect 7: The composite thermal management sheet of aspect 4, wherein the reactive filler composition comprises aluminum trihydrate and zinc borate.

Aspect 8: The composite thermal management sheet of aspect 4, wherein the reactive filler composition comprises borax and hydrous sodium silicate.

Aspect 9: The composite thermal management sheet of aspect 4, wherein the reactive filler composition comprises aluminum trihydrate, zinc borate, and hydrous sodium silicate.

Aspect 10: The composite thermal management sheet of aspect 4, wherein the reactive filler composition comprises borax and zinc borate.

Aspect 11: The composite thermal management sheet of aspect 4, wherein the reactive filler composition comprises borax, zinc borate, and aluminum trihydrate.

Aspect 12: The composite thermal management sheet of any one of aspects 4 to 11, wherein the reactive filler composition further comprises a superabsorbent polymer, waterglass, or both.

Aspect 13: The composite thermal management sheet of aspect 12, wherein the reactive filler composition comprises aluminum trihydrate, hydrous sodium silicate, magnesium carbonate hydroxide pentahydrate, magnesium phosphate tribasic octahydrate, or a combination thereof and a superabsorbent polymer, preferably poly(sodium acrylate).

Aspect 14: The composite thermal management sheet of any one of the foregoing aspects, having a thickness of 1 to 30 millimeters, or 1 to 20 millimeters, or 1 to 15 millimeters, or 1 to 10 millimeters, or 1 to 8 millimeters, or 1.5 to 8 millimeters, or 1.5 to 6 millimeters, or 2.5 to 6 millimeters.

Aspect 15: The composite thermal management sheet of any one of the foregoing aspects, having a density of 5 to 65 pounds per cubic foot (80 to 1,041 kilograms per cubic meter), or 6 to 20 pounds per cubic foot (96 to 320 kilograms per cubic meter), or 8 to 15 pounds per cubic foot (128 to 240 kilograms per cubic meter); a compression force deflection of 0.2 to 125 pounds per square inch (1 to 862 kilopascals), or 0.25 to 20 pounds per square inch (1.7 to 138 kilopascals), or 0.5 to 10 pounds per square inch (3.4 to 68.90.5 kilopascals), each at 25% deflection and determined in accordance with ASTM D3574-17; a compression set of 0 to 15%, or 0 to 10%, or 0 to 5%, determined in accordance with ASTM D 3574-95 Test D at 70° C.; or a combination thereof.

Aspect 16: An assembly for a battery, comprising the composite thermal management sheet of any one the foregoing aspects disposed on a surface of an electrochemical cell, preferably a lithium-ion electrochemical cell.

Aspect 17: The assembly for a battery of aspect 16, wherein the electrochemical cell comprises a prismatic cell, a pouch cell, or a cylindrical cell.

Aspect 18: The assembly for a battery of any one of aspects 16 to 17, wherein the assembly comprises at least two electrochemical cells.

Aspect 19: A battery, comprising: the assembly for a battery of any one of aspects 16 to 18; and a housing at least partially enclosing the assembly for a battery.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

The terms "a" and "an" do not denote a limitation of quantity, but rather denote the presence of at least one of the referenced items. The term "or" means "and/or" unless clearly indicated otherwise by context. Reference throughout the specification to "an aspect," "another aspect," and so forth, means that a particular element (e.g., feature, structure, step, or characteristic) described in connection with the aspect is included in at least an aspect described herein, and may or may not be present in other aspects. In addition, it is to be understood that the described elements can be combined in any suitable manner in the various aspects.

When an element such as a layer, film, region, or substrate is referred to as being "on" another element, it can be directly on the other element or intervening elements can also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

The endpoints of all ranges directed to the same component or property are inclusive of the endpoints, are independently combinable, and include all intermediate points and ranges. For example, ranges of "up to 25 wt %, or 5 to 20 wt %" is inclusive of the endpoints and all intermediate values of the ranges of "5 to 25 wt %," such as 10 to 23 wt %, etc.). The terms "first," "second," and the like, "primary," "secondary," and the like, as used herein do not denote any order, quantity, or importance, but rather are used to distinguish one element from another. The term "combination thereof" is open, and means that the list is inclusive of each element individually, as well as combinations of two or more elements of the list, and combinations of at least one element of the list with like elements not named. Also, the term "combination" is inclusive of blends, mixtures, alloys, reaction products, and the like.

Unless defined otherwise, technical and scientific terms used herein have the same meaning as is commonly understood by one of skill in the art to which this disclosure belongs.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

In the drawings, the widths and thicknesses of layers and regions can be exaggerated for clarity of the specification and convenience of explanation. Like reference numerals in the drawings denote like elements.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat can, typically, have rough and/or nonlinear features. Moreover, sharp angles that are illustrated can be rounded. Thus, the regions illustrated in the figures are schematic in nature and their shapes are not intended to illustrate the precise shape of a region and are not intended to limit the scope of the present claims.

While particular aspects have been described, alternatives, modifications, variations, improvements, and substantial equivalents that are or can be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A composite thermal management sheet for a battery, the composite thermal management sheet comprising:
   a single silicone foam layer; and
   a reactive filler composition disposed within the single silicone foam layer, the reactive filler composition comprising
      a first filler that decomposes to generate water upon initial exposure to heat; and
      a second filler different from the first filler, wherein the second filler forms a thermal barrier layer with a decomposition product of the first filler, or absorbs the water, or both,
   wherein the composite thermal management sheet is a single layer and does not comprise another layer on the single silicone foam layer.

2. The composite thermal management sheet of claim 1, wherein the thermal barrier layer comprises a borosilicate glass layer.

3. The composite thermal management sheet of claim 2, wherein the borosilicate glass comprises silicon derived from decomposition of the silicone foam layer.

4. The composite thermal management sheet of claim 1, wherein the reactive filler composition comprises aluminum trihydrate and zinc borate.

5. The composite thermal management sheet of claim 1, having a thickness of 1 to 6 millimeters.

6. The composite thermal management sheet of claim 1, having
   a density of 5 to 65 pounds per cubic foot (80 to 1,041 kilograms per cubic meter);
   a compression force deflection of 0.2 to 125 pounds per square inch (1 to 862 kilopascals), at 25% deflection and determined in accordance with ASTM D3574-17;
   a compression set of 0 to 15%, determined in accordance with ASTM D 3574-95 Test D at 70° C.; or
   a combination thereof.

7. The composite thermal management sheet of claim 1, wherein the reactive filler composition consists of aluminum trihydrate and zinc borate.

8. An assembly for a battery, comprising
   a first electrochemical cell comprising a first surface and a second surface opposite the first surface;
   an adjacent second electrochemical cell comprising a first surface facing the first electrochemical cell and a second surface opposite the first surface; and
   the composite thermal management sheet of claim 1 disposed directly on
      the first surface of the first electrochemical cell, and
      the first surface of the adjacent second electrochemical cell.

9. A composite thermal management sheet for a battery, the composite thermal management sheet comprising:
   a silicone foam layer; and
   a reactive filler composition disposed within the silicone foam layer, the reactive filler composition comprising
      a first filler that decomposes to generate water upon initial exposure to heat, and
      a second filler different from the first filler, wherein the second filler forms a thermal barrier layer comprising a borosilicate glass layer with a decomposition product of the first filler,
   wherein the composite thermal management does not comprise another layer on the silicone foam layer.

10. A composite thermal management sheet for a battery, the composite thermal management sheet comprising:
    a silicone foam layer; and
    a reactive filler composition disposed within the silicone foam layer, the reactive filler composition
       comprising borax and hydrous sodium silicate, or
       comprising aluminum trihydrate, zinc borate, and hydrous sodium silicate, or
       comprising borax and zinc borate, or
       comprising borax, zinc borate, and aluminum trihydrate, or
       comprising a superabsorbent polymer, or
       consisting of aluminum trihydrate and zinc borate,
    wherein the composite thermal management does not comprise another layer on the silicone foam layer.

11. The composite thermal management sheet of claim 10, wherein
    the reactive filler composition comprises the superabsorbent polymer and a different reactive filler,
    the superabsorbent polymer, the different reactive filler, or both decomposes to generate water upon initial exposure to heat, and
    the superabsorbent polymer forms a thermal barrier layer with a decomposition product of the different filler, or absorbs the water, or both; the different filler forms a thermal barrier layer with a decomposition product of the superabsorbent polymer, or absorbs the water, or both; or both.

12. The composite thermal management sheet of claim 10, wherein the reactive filler composition consists of aluminum trihydrate and zinc borate.

13. The composite thermal management sheet of claim 10, wherein the first filler and the second filler are
    aluminum trihydrate, ammonium nitrate, borax, hydrous sodium silicate, magnesium hydroxide, magnesium carbonate hydroxide pentahydrate, magnesium phosphate tribasic octahydrate, zinc borate, waterglass, or a combination thereof; and
    the superabsorbent polymer.

14. The composite thermal management sheet of claim 13, wherein the reactive filler composition comprises
   aluminum trihydrate, hydrous sodium silicate, magnesium carbonate hydroxide pentahydrate, magnesium phosphate tribasic octahydrate, waterglass, or a combination thereof; and
   the superabsorbent polymer.

15. The composite thermal management sheet of claim 13, wherein the reactive filler composition comprises
   ammonium nitrate, borax, hydrous sodium silicate, magnesium hydroxide, magnesium carbonate hydroxide pentahydrate, magnesium phosphate tribasic octahydrate, zinc borate, or a combination thereof; and
   the superabsorbent polymer.

16. The composite thermal management sheet of claim 13, wherein the reactive filler composition comprises
   aluminum trihydrate; and
   the superabsorbent polymer.

17. The composite thermal management sheet of claim 10, wherein the reactive filler composition comprises borax and hydrous sodium silicate.

18. The composite thermal management sheet of claim 10, wherein the reactive filler composition comprises aluminum trihydrate, zinc borate, and hydrous sodium silicate.

19. The composite thermal management sheet of claim 10, wherein the reactive filler composition comprises borax and zinc borate.

20. The composite thermal management sheet of claim 10, wherein the reactive filler composition comprises borax, zinc borate, and aluminum trihydrate.

* * * * *